US 8,690,185 B2

(12) United States Patent
Yamaji

(10) Patent No.: US 8,690,185 B2
(45) Date of Patent: Apr. 8, 2014

(54) AIRBAG DEVICE

(75) Inventor: Naoki Yamaji, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/979,909

(22) PCT Filed: Jan. 18, 2012

(86) PCT No.: PCT/JP2012/050939
§ 371 (c)(1),
(2), (4) Date: Aug. 8, 2013

(87) PCT Pub. No.: WO2012/099154
PCT Pub. Date: Jul. 26, 2012

(65) Prior Publication Data
US 2013/0307254 A1    Nov. 21, 2013

(30) Foreign Application Priority Data

Jan. 21, 2011    (JP) ................................. 2011-011386

(51) Int. Cl.
*B60R 21/233*    (2006.01)
*B60R 21/2338*    (2011.01)
*B60R 21/203*    (2006.01)

(52) U.S. Cl.
USPC ........ 280/729; 280/731; 280/743.2; 280/742; 280/739

(58) Field of Classification Search
USPC .............. 280/729, 731, 743.2, 742, 740, 736, 280/739, 728.1
See application file for complete search history.

(56) References Cited

U.S. PATENT DOCUMENTS

| | | | |
|---|---|---|---|
| 5,253,892 A * | 10/1993 | Satoh | 280/731 |
| 6,086,092 A * | 7/2000 | Hill | 280/729 |
| 6,382,662 B1 * | 5/2002 | Igawa | 280/729 |
| 7,380,822 B2 * | 6/2008 | Abe | 280/743.1 |
| 8,047,563 B2 * | 11/2011 | Maripudi | 280/728.3 |
| 8,308,191 B2 * | 11/2012 | Hiruta et al. | 280/736 |
| 2003/0020264 A1 | 1/2003 | Abe et al. | |
| 2007/0045997 A1 | 3/2007 | Abe et al. | |

FOREIGN PATENT DOCUMENTS

| | | | |
|---|---|---|---|
| JP | 2002-019568 A | | 1/2002 |
| JP | 2003-034208 A | | 2/2003 |
| JP | 2007161107 A | * | 6/2007 |
| JP | 2007-216943 A | | 8/2007 |
| JP | 2007-284026 A | | 11/2007 |
| JP | 2007-331658 A | | 12/2007 |

* cited by examiner

*Primary Examiner* — Keith Frisby
(74) *Attorney, Agent, or Firm* — Sughrue Mion, PLLC

(57) ABSTRACT

An object is to prevent an airbag from bursting out toward an occupant and to inflate and deploy the airbag in a stable manner. An inner bag (30A) inflates with gas supplied from an inflator (3). An outer bag (20) inflates with the gas supplied through a flow port in the inner bag (30A). A restriction member (40A) restricts the movement of a front surface of the outer bag (20) in the occupant direction. An opening (41) in the restriction member (40A) is engaged with the outer circumference of the inflated inner bag (30A) and moves in the occupant direction along the outer circumference of the inner bag (30A) in accordance with the inflation of the outer bag (20). The restriction member (40A) moves the front surface of the outer bag (20) in accordance with the movement of the opening (41).

10 Claims, 14 Drawing Sheets

AIRBAG DEVICE

CROSS REFERENCE TO RELATED APPLICATIONS

This application is a National Stage of International Application No. PCT/JP2012/050939 filed Jan. 18, 2012, claiming priority based on Japanese Patent Application No. 2011-011386 filed Jan. 21, 2011, the contents of all of which are incorporated herein by reference in their entirety.

TECHNICAL FIELD

The present invention relates to airbag devices installed in vehicles, such as cars, to protect occupants.

BACKGROUND ART

Airbag devices are used to protect occupants in an emergency or a collision of vehicles. For example, an airbag device attached to a steering wheel inflates and deploys an airbag in front of a driver's seat. An occupant in the driver's seat is received and restrained by the airbag in front of the occupant. In a conventionally known airbag device of this type, the inside of an airbag is divided into a plurality of chambers so that the airbag can quickly deploy sideways (see PTL 1).

In the conventional airbag device, a first chamber is delimited by an inner panel at the center of the airbag, and a second chamber and a third chamber are delimited by separation panels around the first chamber. However, in this airbag device, the second chamber and the third chamber sequentially inflate after the first chamber inflates toward an occupant with high-pressure gas generated by an inflator. Hence, at the initial stage of deployment of the airbag, the first chamber may burst out and strike the occupant. This may increase the impact on the occupant. The impact on the occupant is large especially when the occupant is near the steering wheel.

Furthermore, in the conventional airbag device, bursting out of the airbag suddenly stops when the inner panel is fully stretched. The airbag inflates to a thickness corresponding to the length of the inner panel. Therefore, if the inner panel is too long, the distance by which the airbag projects is large, increasing the risk to the occupant. Conversely, if the inner panel is too short, the airbag is thin, failing to receive the occupant. The occupant may collide with the steering wheel. Furthermore, the airbag may bounce as if it expands and contracts in the thickness direction due to a reaction force generated when the inner panel is suddenly stopped.

FIG. 17 includes side views illustrating a bouncing conventional airbag. FIGS. 17A and 17B also illustrate a steering wheel and an occupant colliding with the airbag.

As illustrated in the figures, a conventional airbag 100 may bounce on a steering wheel 90 after it inflates and deploys (arrow W in FIG. 17A). As a result, the shape of the airbag 100 varies between a shape V1 (maximum thickness) and a shape V2 (minimum thickness). Because the shape of the airbag 100 is unstable, the performance of the airbag 100 may be unstable. Furthermore, for example, if an occupant 91 (see FIG. 17B) comes into contact with the airbag 100 in the shape V2 (minimum thickness), the absorbing stroke of the airbag 100 may be insufficient. The absorbing stroke is a stroke of the airbag 100 when absorbing the impact and energy of the occupant 91. Accordingly, from the standpoint of safely restraining the occupant 91, the conventional airbag 100 is required to inflate and deploy in a more stable manner.

Furthermore, in the conventional airbag 100, because a joint portion of the inner panel (not shown) is subjected to a high load, the strength of the joint portion needs to be increased. For example, when the joint is made by stitching, the stitching strength needs to be increased by adding a reinforcing fabric piece, changing the thread size, or changing the stitching shape. Therefore, the conventional airbag 100 has problems of increased manufacturing efforts and costs.

CITATION LIST

Patent Literature

PTL 1: Japanese Unexamined Patent Application, Publication No. 2007-284026

SUMMARY OF INVENTION

Technical Problem

The present invention has been made in view of the above-described conventional problems, and an object thereof is to prevent an airbag from bursting out toward an occupant and to inflate and deploy the airbag in a stable manner. Furthermore, the occupant is safely restrained by the airbag.

Solution to Problem

The present invention provides an airbag device including an airbag that inflates and deploys with gas to protect an occupant in a vehicle and an inflator to supply gas to the airbag. The airbag includes an inner bag that inflates with the gas supplied from the inflator and has a gas flow port, an outer bag that accommodates the inner bag and inflates with the gas supplied through the flow port in the inner bag, and a restriction member that is connected to a front surface, inside the outer bag, of the outer bag and restricts movement of the front surface in an occupant direction. The restriction member has an opening that can be engaged with the outer circumference of the inflated inner bag and can move in the occupant direction along the outer circumference of the inner bag in accordance with the inflation of the outer bag, the restriction member moving the front surface of the outer bag in the occupant direction in accordance with the movement of the opening.

Advantageous Effects of Invention

The present invention makes it possible to prevent an airbag from bursting out toward an occupant and to inflate and deploy the airbag in a stable manner. Furthermore, the occupant can be safely restrained by the airbag.

DESCRIPTION OF EMBODIMENTS

An airbag device according to an embodiment of the present invention will be described below with reference to the drawings.

The airbag device according to this embodiment is disposed in a vehicle and receives an occupant with an inflatable and deployable airbag. The occupant is protected by the airbag. For example, the airbag device is provided around a seat (a driver's seat or a passenger's seat) in a vehicle and protects the occupant seated in the seat. Hereinbelow, a description will be given by taking an airbag device installed in a steering wheel as an example. The steering wheel is located in front of the driver's seat.

Figure 1:
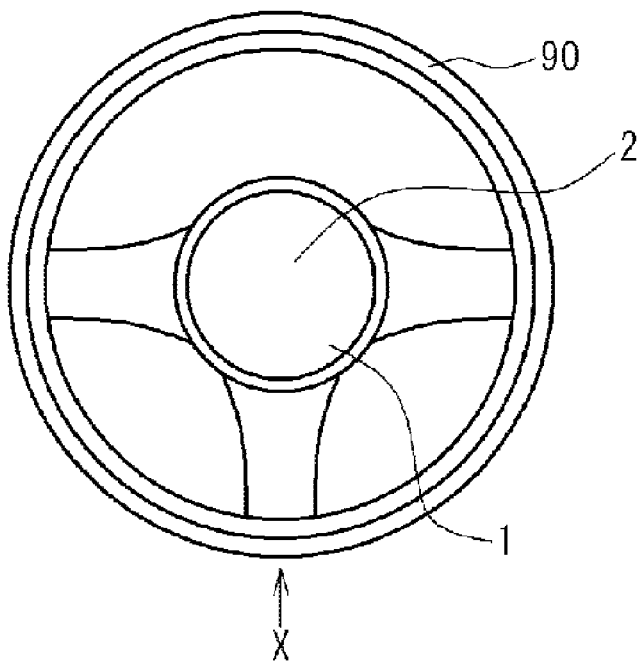
FIG. 1 is a front view illustrating a steering wheel provided with an airbag device.

FIG. 1 is a front view illustrating the steering wheel provided with the airbag device. FIG. 1 illustrates the steering wheel as viewed from the occupant side.

As illustrated in the figure, the airbag device 1 is installed in the central portion of the steering wheel 90 and is located in front of the occupant. The airbag device 1 includes an airbag cover 2 and an airbag (not shown) disposed inside the airbag cover 2. The airbag cover 2 covers the surface of the airbag device 1. The airbag is stored, in a folded state, in the airbag cover 2. When inflating, the airbag opens the airbag cover 2 by pushing it and deploys in a vehicle cabin. The airbag inflates and deploys between the steering wheel 90 and the occupant. At this time, the airbag inflates sideways and in a direction where the occupant is located (hereinbelow, "occupant direction"). The airbag deploys so as to cover the steering wheel 90.

First Embodiment

Figure 2:
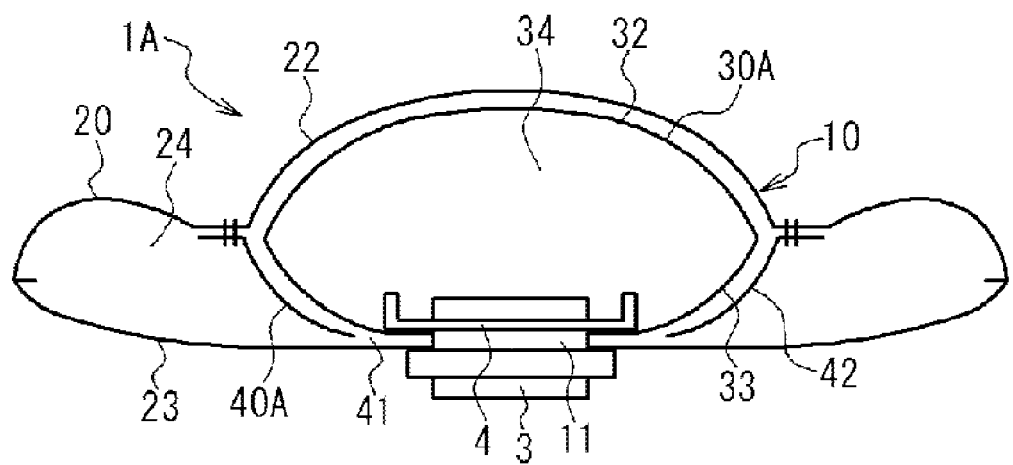
FIG. 2 is a diagram illustrating an airbag device according to a first embodiment.
Figure 3:
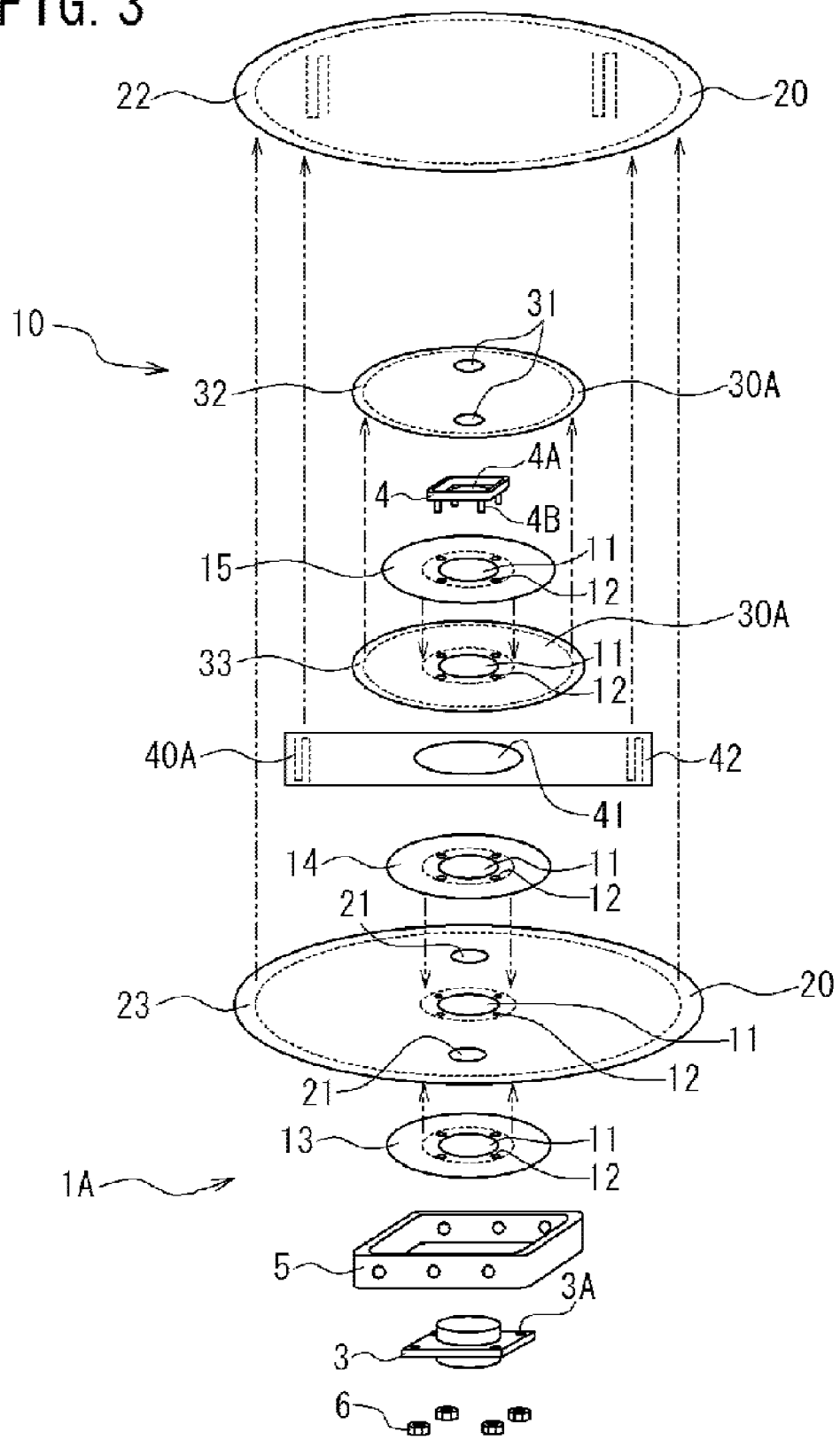
FIG. 3 is an exploded perspective view of the airbag device in FIG. 2.

FIG. 2 is a diagram illustrating an airbag device 1 according to a first embodiment (hereinbelow, "airbag device 1A"). FIG. 2 schematically illustrates the airbag device 1A as viewed from an arrow X direction in FIG. 1. Furthermore, FIG. 2 illustrates an airbag 10 at the initial stage of deployment (inflation) in cross-section. FIG. 3 is an exploded perspective view of the airbag device 1A in FIG. 2. FIG. 3 illustrates components of the airbag device 1A spaced apart in the up-down direction. FIG. 3 also illustrates, with arrows, the relationships between the components to be combined and the positions where the components are combined.

As illustrated in the figures, the airbag device 1A includes the airbag 10 that is inflatable and deployable, an inflator 3, a cushion ring 4 disposed in the airbag 10, and a reaction plate 5 (omitted in FIG. 2). The airbag 10 inflates and deploys toward the occupant with the gas supplied from the inflator 3. The airbag 10 protects the occupant in the vehicle.

The inflator 3 is a disk-type gas generator. The inflator 3 has a plurality of gas discharge ports (not shown) in the outer circumference of an end in the thickness direction. The end of the inflator 3 is inserted into the airbag 10 from an attachment opening 11 formed in the airbag 10. In this state, the inflator 3 is attached to the attachment opening 11. In an emergency of the vehicle or when an impact is detected, the inflator 3 generates gas within the airbag 10 and supplies the gas to the airbag 10. At this time, the inflator 3 radially discharges the gas from the plurality of gas discharge ports. The airbag 10 in a predetermined folded shape inflates and deploys with the gas.

The cushion ring 4 has a rectangular plate shape. The cushion ring 4 has a hole 4A at the central portion thereof, into which the inflator 3 is inserted (see FIG. 3). Four bolts 4B are fixed around the hole 4A in the cushion ring 4. The cushion ring 4 fastens the airbag 10 to the reaction plate 5. A portion around the attachment opening 11 in the airbag 10 is sandwiched between the cushion ring 4 and the reaction plate 5. At this time, first, the bolts 4B are inserted into insertion holes 12 provided in the respective components of the airbag 10. The respective components of the airbag 10 are temporarily fastened with the bolts 4B. Next, after the bolts 4B are inserted into attachment holes (not shown) in the reaction plate 5, the inflator 3 is attached to the reaction plate 5. The bolts 4B are inserted into insertion holes 3A in the inflator 3. Next, the bolts 4B are fixed to the reaction plate 5 with locknuts 6. In this way, the cushion ring 4, the airbag 10, and the inflator 3 are fixed to the reaction plate 5.

The reaction plate 5 is formed of a rectangular frame. The cushion ring 4 and the airbag 10 are attached to one side of the reaction plate 5. The inflator 3 is attached to the other side of the reaction plate 5. The folded airbag 10 is disposed within the reaction plate 5. The airbag cover 2 is attached to the reaction plate 5. The airbag 10 is covered by the airbag cover 2. Then, the reaction plate 5 is fixed to the steering wheel 90.

The airbag 10 includes reinforcing fabric pieces 13 and 14, a protection fabric piece 15, and an outer bag 20. Furthermore, the airbag 10 includes an inner bag 30 and a restriction member 40 (hereinbelow, the inner bag and the restriction member according to this embodiment will be denoted by 30A and 40A, respectively). The inner bag 30A and the restriction member 40A are disposed inside the outer bag 20. The components of the airbag 10 are formed of base fabric pieces, which are formed by cutting, for example, a woven fabric or a sheet. The reinforcing fabric pieces 13 and 14 and the protection fabric piece 15 each have the attachment opening 11 at the center thereof. The reinforcing fabric pieces 13 and 14 and the protection fabric piece 15 have circular shapes and are disposed at predetermined positions between the cushion ring 4 and the reaction plate 5.

The outer bag 20 and the inner bag 30A are bag members having circular shapes in front view. The outer bag 20 and the inner bag 30A constitute an outer inflation portion and an inner inflation portion of the airbag 10, respectively. The cushion ring 4 is inserted into the inner bag 30A through the attachment openings 11 provided in the outer bag 20 and the inner bag 30A. The outer bag 20 and the inner bag 30A are fixed to the reaction plate 5 with the cushion ring 4. Portions around the attachment openings 11 provided in the outer bag 20 and the inner bag 30A are retained between the cushion ring 4 and the reaction plate 5.

The components of the airbag 10 will be described in detail below. Note that, in the present invention, concerning the outer bag 20, the inner bag 30, and the airbag 10, a portion located on the occupant side (i.e., upper side in FIGS. 2 and 3), inside the vehicle, is referred to as a "front surface", and a portion located on the vehicle body side (i.e., lower side in FIGS. 2 and 3) is referred to as a "rear surface". Concerning the outer bag 20 and the inner bag 30 assembled into the airbag 10, a surface located on the outer side is referred to as an "outer surface", and a surface located on the inner side is referred to as an "inner surface".

An end of the inflator 3 is disposed inside the inner bag 30A. The inner bag 30A inflates with the gas supplied from the inflator 3. The front surface of the inner bag 30A is provided with at least one (in this embodiment, two) flow ports 31. The flow ports 31 allow the gas to flow. The inner bag 30A inflates first with the gas from the inflator 3. The inner bag 30A supplies the gas to the outer bag 20 through the flow ports 31.

The inner bag 30A includes a front base fabric piece (front panel) 32 that constitutes the front surface and a rear base fabric piece (rear panel) 33 that constitutes the rear surface. The base fabric pieces 32 and 33 are formed in circular shapes having the same diameter. The base fabric pieces 32 and 33 are joined along the outer circumferences thereof by stitching or by bonding (herein, by stitching). The inside and outside of the inner bag 30A are delimited by the base fabric pieces 32 and 33. An air chamber 34 is formed inside the inner bag 30A. The flow ports 31 provided at two positions in the front base fabric piece 32 allow the gas inside the inner bag 30A to flow toward the occupant direction. The protection fabric piece 15 is attached to the inner surface of the rear base fabric piece 33. The protection fabric piece 15 is disposed between the rear base fabric piece 33 and the cushion ring 4 and protects the rear base fabric piece 33 from the cushion ring 4.

Figure 4A:
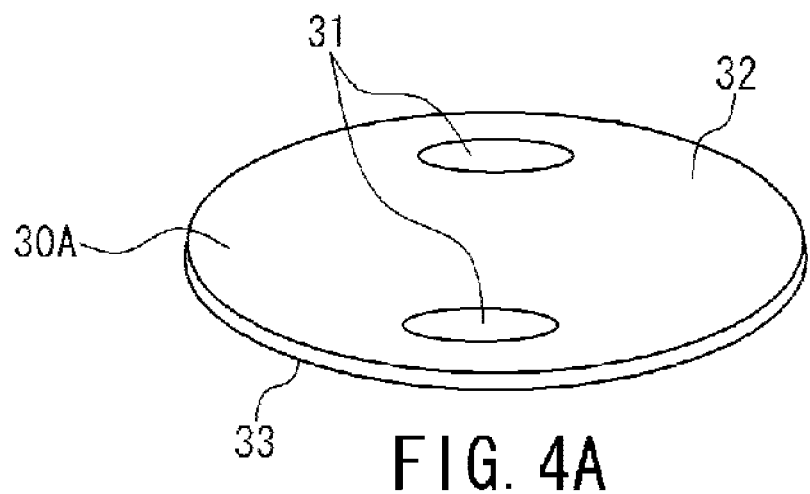
FIG. 4 includes perspective views of an inner bag according to the first embodiment.
Figure 4B:
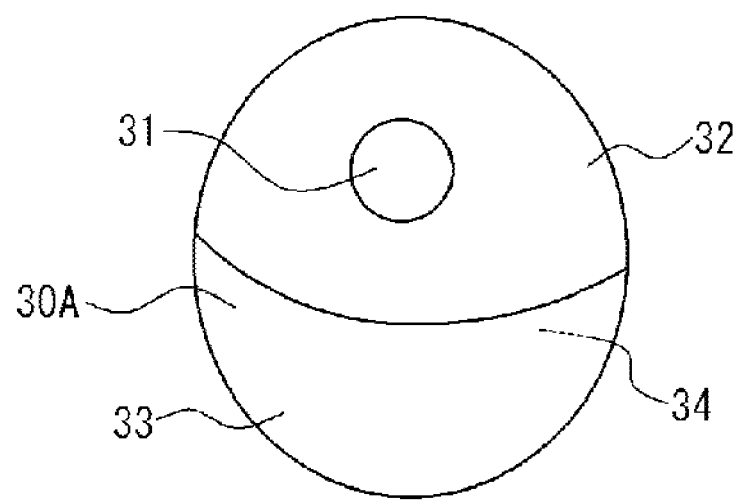

FIG. 4 includes perspective views of the inner bag 30A. FIG. 4A illustrates the inner bag 30A before inflating. FIG. 4B illustrates the inflated inner bag 30A.

As illustrated in FIG. 4A, the inner bag 30A before inflating has a circular shape. The front base fabric piece 32 and the rear base fabric piece 33 are stacked on top of each other. As illustrated in FIG. 4B, the inflated inner bag 30A has a ball shape. The air chamber 34 in the base fabric pieces 32 and 33 is filled with the gas. In this manner, the inner bag 30A inflates within the outer bag 20, from a flat shape to a three-dimensional shape.

The outer bag 20 (see FIGS. 2 and 3) is a main bag that accommodates the inner bag 30A therein. The outer bag 20 inflates with the gas supplied through the flow ports 31 provided in the inner bag 30A. At least one (in this embodiment, two) vent hole 21 is provided in the rear surface of the outer bag 20. The vent holes 21 allow the gas inside the outer bag 20 to be discharged outside the outer bag 20. The outer bag 20 starts to inflate, following the inflation of the inner bag 30A. The outer bag 20 surrounding the inner bag 30A inflates to a larger size than the inner bag 30A.

The outer bag 20 includes a front base fabric piece (front panel) 22 that constitutes the front surface and a rear base fabric piece (rear panel) 23 that constitutes the rear surface. The base fabric pieces 22 and 23 are formed in circular shapes having the same diameter and are joined along the outer circumferences thereof. The inside and outside of the outer bag 20 are delimited by the base fabric pieces 22 and 23. An air chamber 24 is formed inside the outer bag 20. The vent holes 21 are provided at two positions in the rear base fabric piece 23 and allow the gas inside the outer bag 20 to be discharged toward the vehicle body. The reinforcing fabric pieces 13 and 14 are attached to the inner and outer surfaces of the rear base fabric piece 23. The reinforcing fabric pieces 13 and 14 strengthen the portion around the attachment opening 11 in the rear base fabric piece 23. The reinforcing fabric pieces 13 and 14 protect the rear base fabric piece 23 from the gas and heat generated by the inflator 3.

The inner bag 30A and the outer bag 20 inflate with the rear surfaces thereof, where the inflator 3 is located, being connected to each other. Furthermore, the inner bag 30A and the outer bag 20 deploy in the occupant direction and sideways, starting from the inflator 3, in front of the occupant. At this time, first, the inner bag 30A accommodating the inflator 3 inflates within the outer bag 20. The entire inner bag 30A inflates and deploys. The outer bag 20 on the outside of the inner bag 30A gradually inflates. At a predetermined time after the inflation of the inner bag 30A has completed, the entire outer bag 20 inflates and deploys. Furthermore, the restriction member 40A restricts the inflation and deployment of the outer bag 20. The outer bag 20 is unfolded sideways and then gradually inflates in the occupant direction.

The restriction member 40A is connected to the front surface (front base fabric piece 22) of the outer bag 20, inside the outer bag 20. When the outer bag 20 inflates, the restriction member 40A restricts the movement of the front surface of the outer bag 20 in the occupant direction. Herein, the restriction member 40A is composed of a belt-shaped member 42 having an opening 41 at the center. The belt-shaped member 42 is a rectangular base fabric piece (belt-shaped fabric piece). Before the airbag 10 inflates, the belt-shaped member 42 is disposed between the rear surface (rear base fabric piece 33) of the inner bag 30A and the rear surface (rear base fabric piece 23) of the outer bag 20. The belt-shaped member 42 is stitched to the front base fabric piece 22 of the outer bag 20 at positions on the outer side of the edge of the inner bag 30A. In this way, the ends of the belt-shaped member 42 are joined to the front surface of the outer bag 20. The inner bag 30A is disposed between the restriction member 40A and the front surface of the outer bag 20.

The opening 41 in the restriction member 40A is a circular hole. The opening 41 is formed to have a predetermined diameter that is larger than the outside diameter of the inflator 3 and is smaller than the inflated and deployed inner bag 30A. The opening 41 is a passing hole through which the inner bag 30A can pass. Before the airbag 10 inflates, the opening 41 is disposed around the inflator 3 so as to be concentric with the inner bag 30A. That is, the opening 41 is disposed between the rear surface of the inner bag 30A and the rear surface of the outer bag 20 so as to allow the inner bag 30A to pass therethrough. When the airbag 10 inflates, the opening 41 in the restriction member 40A is engaged with the outer circumference of the inflated inner bag 30A and is retained by the inner bag 30A. Furthermore, as the outer bag 20 inflates, the opening 41 is pulled by the front surface of the outer bag 20. The opening 41 gradually moves in the occupant direction along the outer circumference of the inner bag 30A. The restriction member 40A moves the front surface of the outer bag 20 in the occupant direction in accordance with the movement of the opening 41.

Next, a manufacturing process of the airbag device 1A (see FIG. 3) will be described.

Concerning the outer bag 20, first, two reinforcing fabric pieces 13 and 14 are stitched to the inner and outer surfaces of the rear base fabric piece 23 (in FIG. 3, dashed lines indicate stitching portions). Furthermore, the ends of the restriction member 40A are stitched to the inner surface of the front base fabric piece 22. Next, the base fabric pieces 22 and 23 are stacked such that the outer surfaces thereof are face-to-face, and the base fabric pieces 22 and 23 are stitched together along the outer circumferences thereof. Then, the base fabric pieces 22 and 23 are turned inside out through the attachment opening 11. The restriction member 40A is disposed inside the outer bag 20. Note that FIG. 3 illustrates the arrangement of the components after the outer bag 20 and the inner bag 30A are turned inside out.

Concerning the inner bag 30A, first, the protection fabric piece 15 is stitched to the inner surface of the rear base fabric piece 33. Next, the base fabric pieces 32 and 33 are stacked such that the outer surfaces thereof are face-to-face, and the base fabric pieces 32 and 33 are stitched together along the outer circumferences thereof. Then, the base fabric pieces 32 and 33 are turned inside out through the attachment opening 11. In this way, the inner bag 30A is formed. Next, the inner bag 30A is inserted into the outer bag 20 through the attachment opening 11 in the outer bag 20. The inner bag 30A is arranged between the front base fabric piece 22 of the outer bag 20 and the restriction member 40A. The inner bag 30A and the outer bag 20 are disposed concentrically with each other.

Next, the cushion ring 4 is inserted into the inner bag 30A through the attachment opening 11. The inner bag 30A and the outer bag 20 are temporarily fastened with the bolts 4B. The airbag 10, composed of the inner bag 30A and the outer bag 20, is attached to the reaction plate 5 using the cushion ring 4. Next, the inflator 3 is attached to the reaction plate 5. The locknuts 6 are threaded onto the bolts 4B. In this way, the cushion ring 4, the airbag 10, and the inflator 3 are fixed to the reaction plate 5. Next, the airbag 10 is folded and disposed inside the reaction plate 5. Note that the airbag 10 may be folded before being fixed to the reaction plate 5.

Finally, the airbag cover 2 (not shown in FIG. 3) is attached to the reaction plate 5. The manufacturing of the airbag device 1A is completed by going through the above-described process. The airbag device 1A is attached to the steering wheel 90 (see FIG. 1). After that, the airbag device 1A activates the inflator 3 in an emergency of the vehicle. The inflator 3 generates gas. The gas unfolds and inflates the airbag 10. The airbag 10 inflates and deploys so as to cover the steering wheel 90.

FIG. 5 includes cross-sectional views illustrating, in sequence, stages of inflation and deployment of the airbag 10. FIG. 5 illustrates the respective stages of the airbag 10 corresponding to FIG. 2.

Figure 5A:
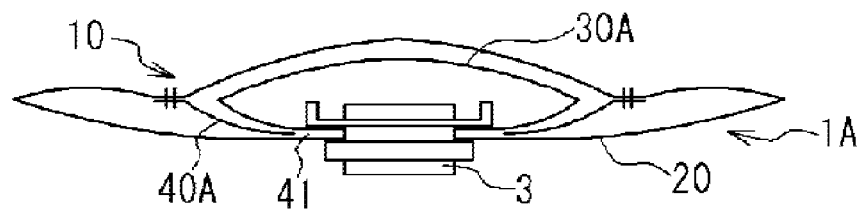
FIG. 5 includes cross-sectional views illustrating, in sequence, stages of inflation and deployment of an airbag.
Figure 5B:
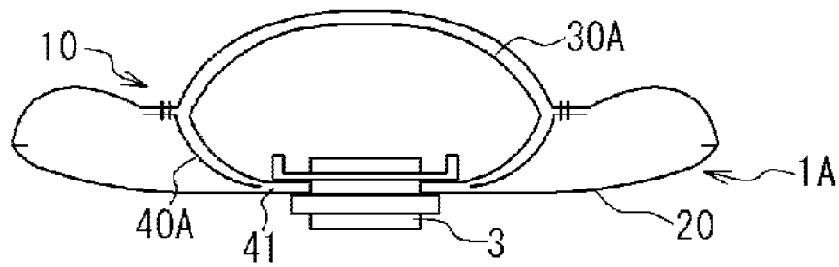
Figure 5C:
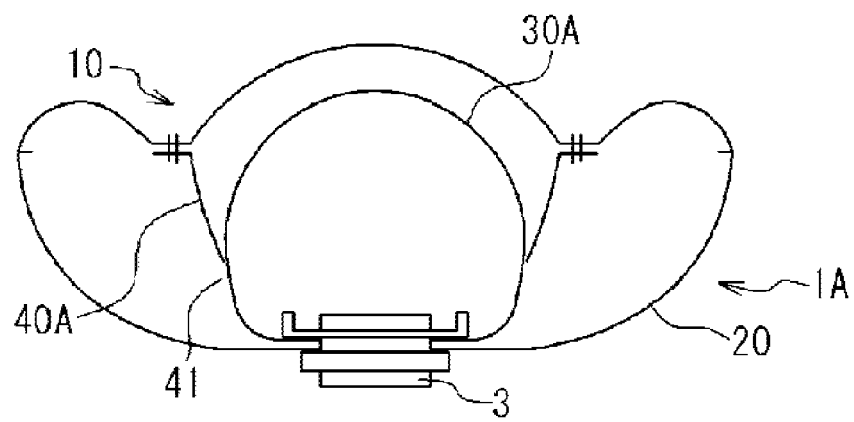
Figure 5D:
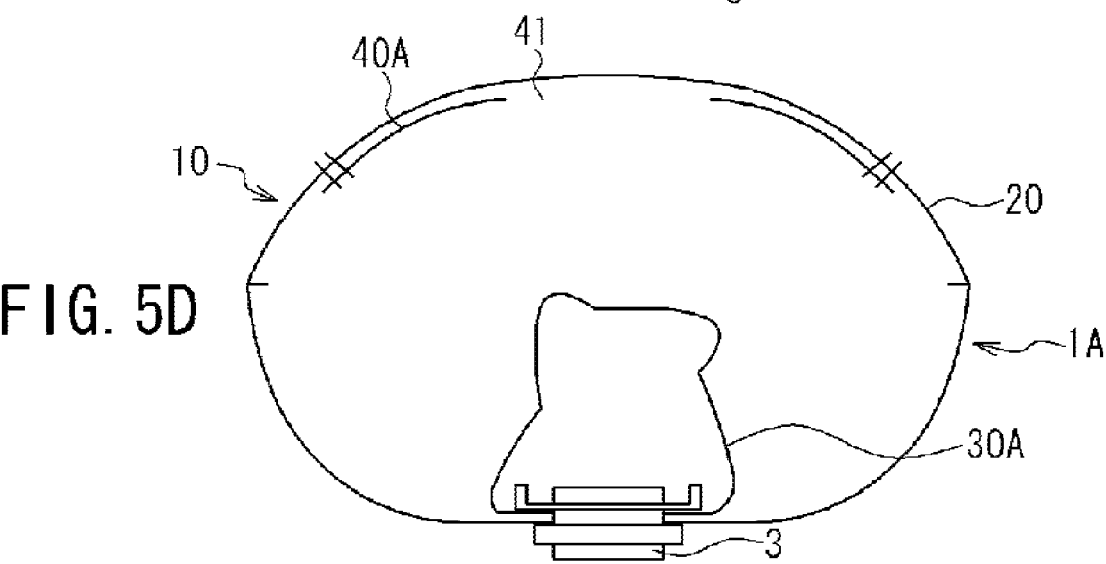
Figure 6A:
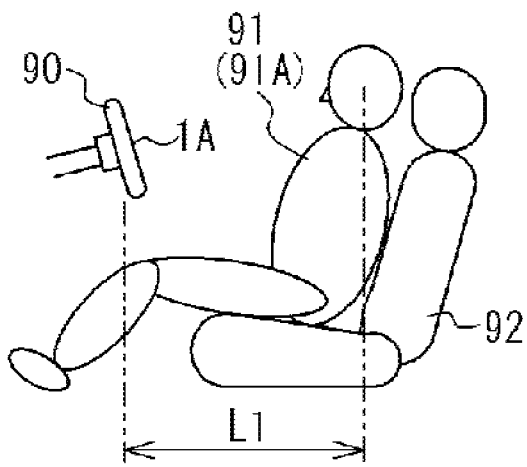
FIG. 6 includes side views illustrating the airbag device protecting an occupant.
Figure 6B:
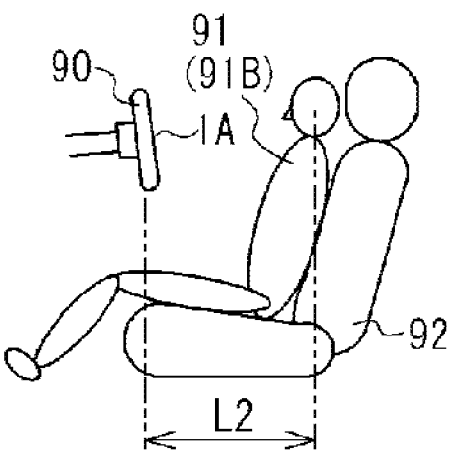
Figure 6C:
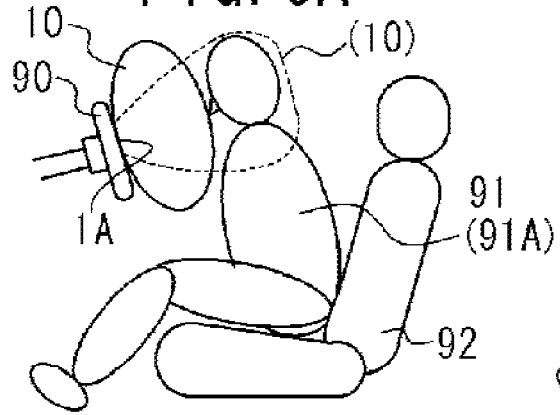
Figure 6D:
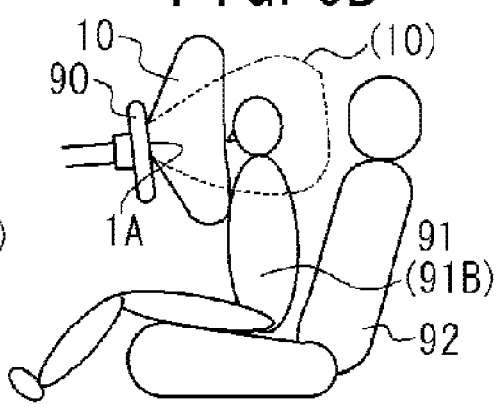

At the initial stage of deployment of the airbag 10, first, the inner bag 30A inflates with the gas supplied from the inflator 3 (see FIG. 5A). The inner bag 30A inflates and deploys between the restriction member 40A and the front surface of the outer bag 20. The opening 41 in the restriction member 40A is smaller than the inflated and deployed inner bag 30A. Therefore, the opening 41 is engaged with the inner bag 30A in the opening 41 (see FIG. 5B). The opening 41 in the restriction member 40A is engaged with the inner bag 30A. A portion around the opening 41 in the restriction member 40A and portions on the outer sides of the opening 41 are pressed against the rear surface of the inner bag 30A. In this state, the restriction member 40A is retained by the rear surface of the inner bag 30A. The movement in the occupant direction and deformation of the restriction member 40A are suppressed. Furthermore, the restriction member 40A applies tension to the front surface of the outer bag 20 to pull the front surface in the direction opposite to the occupant direction (vehicle body direction).

The restriction member 40A prevents the movement of the front surface of the outer bag 20 in the occupant direction. As a result, inflation and bursting out of the inner bag 30A in the occupant direction are suppressed. The inner bag 30A inflates more largely sideways than in the occupant direction. The central portion of the airbag 10 inflates to a predetermined thickness along with the inflation of the inner bag 30A, without bursting out in the occupant direction.

The outer bag 20 starts to inflate with the gas supplied through the flow ports 31 provided in the inner bag 30A. At this time, because the inflation of the outer bag 20 in the occupant direction is restricted by the restriction member 40A, the outer bag 20 inflates preferentially sideways. The outer bag 20 deploys over a wide area so as to extend outward. Furthermore, the entire outer bag 20 uniformly inflates sideways, starting from the inner bag 30A located at the center. Next, as the internal pressure of the outer bag 20 increases, the outer bag 20 inflates in the occupant direction. The thickness of the outer bag 20 increases.

Once the inner bag 30A has completed inflation, it discharges the gas through the flow ports 31. The inner bag 30A supplies the gas to the entire outer bag 20. As a result, the internal pressure of the outer bag 20 gradually increases. The pressure difference between the inside and outside of the inner bag 30A decreases. As a result, a force to maintain the rigidity and inflated shape of the inner bag 30A decreases (see FIG. 5C). Furthermore, the inner bag 30A gradually contracts within the opening 41 in the restriction member 40A as it discharges gas. Reductions in volume and outside diameter of the inner bag 30A progress.

As a result of the contraction of the inner bag 30A, the size of the inner bag 30A approaches the size of the opening 41 in the restriction member 40A. At the end, the size of the inner bag 30A is smaller than the size of the opening 41. During this, the restriction member 40A is pulled in the occupant direction by the inflating outer bag 20. As a result, the opening 41 moves in the occupant direction while receiving resistance from the contracting inner bag 30A. More specifically, as the outer bag 20 inflates and the inner bag 30A contracts, the opening 41 gradually moves in the occupant direction along the outer circumference of the contracting inner bag 30A. Furthermore, the restriction member 40A moves such that the opening 41 squeezes the inner bag 30A located within the opening 41. Due to this movement, the restriction member 40A receives the resistance from the inner bag 30A.

Then, the inner bag 30A passes through the opening 41. When the opening 41 is disengaged from the inner bag 30A, the restriction member 40A is freed from the inner bag 30A (see FIG. 5D). The restriction of the outer bag 20 by the restriction member 40A is removed. The outer bag 20 inflates in the occupant direction and fully inflates and deploys in front of the occupant. In this manner, the restriction member 40A moves the front surface of the outer bag 20 in the occupant direction along with the movement of the opening 41. The restriction member 40A restricts the movement of the front surface of the outer bag 20 in the occupant direction.

The airbag device 1A receives and protects the occupant with the inflated and deployed outer bag 20 (airbag 10). Herein, the airbag 10 mainly receives and restrains the upper part of the occupant's body. At the same time, the airbag 10 absorbs the impact energy to reduce the impact on the occupant. Furthermore, when receiving the occupant, the airbag 10 discharges the gas through the vent holes 21 in the outer bag 20 to reduce the impact on the occupant.

As has been described above, this airbag device 1A restricts the movement of the front surface of the outer bag 20 with the restriction member 40A, allowing the front surface to gradually move in the occupant direction. It is also possible to prevent the airbag 10 from bursting out toward the occupant at the initial stage of deployment. It is possible to apply stable resistance to the front surface of the outer bag 20 with the restriction member 40A and the inner bag 30A, from the initial stage to the final stage of deployment of the outer bag 20. Therefore, it is possible to gradually inflate the airbag 10 to a large thickness without causing local bursting out or rapid bursting out. Accordingly, it is possible to prevent the airbag 10 from striking the occupant and to reduce the impact caused when the airbag 10 comes into contact with the occupant. Even when the occupant is located near the steering wheel 90, the impact on the occupant can be considerably reduced.

Because local bursting out of the airbag 10 can be suppressed, the front surface of the airbag 10 can be moved in a relatively flat state. Hence, it is possible to receive the occupant with a large area and to safely restrain the occupant. Because the airbag 10 gradually inflates in the occupant direction, it is possible to suppress expansion and contraction of the airbag 10 in the thickness direction after completion of the inflation. As a result, bouncing of the airbag 10 is suppressed, and hence, it is possible to inflate and deploy the airbag 10 in a stable manner. Because of this, the inflated shape of the airbag 10 and the position of the front surface thereof are stabilized in an early stage. Furthermore, because the performance of the airbag 10 is also stabilized, the airbag 10 can safely restrain the occupant even immediately after it inflates and deploys. Because an effective absorbing stroke of the airbag 10 can be ensured every time when the occupant comes into contact with the airbag 10, the impact and energy of the occupant can be reliably absorbed.

The opening 41 in the restriction member 40A gradually moves in the occupant direction while receiving the resistance from the contracting inner bag 30A. Thus, there is no sudden application of a large load to the restriction member 40A, the outer bag 20, or the inner bag 30A. Because the loads to the joint portions become small, the strength of the joint portions may be relatively low. Therefore, the restrictions on the specifications of the components, the conditions of the components, the specifications of the joint portions, and the conditions of the joint portions are significantly eased. Various designs for the components and joint portions become possible. The stitching portions, the reaction plate 5, or the cushion ring 4 may be simplified. Accordingly, it is possible to reduce the efforts required to manufacture the airbag 10 and to improve the productivity. It is also possible to reduce the manufacturing costs of the airbag 10.

Because the opening 41 in the restriction member 40A is disposed between the rear surface of the inner bag 30A and the rear surface of the outer bag 20, the opening 41 is reliably engaged with the inflated inner bag 30A. In particular, even immediately after the inner bag 30A starts to inflate, the opening 41 is retained by the rear surface of the inner bag 30A without allowing the inner bag 30A to pass therethrough. Therefore, the movement of the front surface of the outer bag 20 can be reliably restricted by the restriction member 40A. When the ends of the restriction member 40A, composed of the belt-shaped member 42, are joined to the front surface of the outer bag 20, the tension applied to the joint portions can be distributed. Furthermore, the inner bag 30A inflates between the restriction member 40A and the front surface of the outer bag 20. Therefore, the inflated shape of the inner bag 30A can be adjusted by the restriction member 40A and the outer bag 20.

As has been described above, the airbag device 1A can inflate and deploy the airbag 10 in a stable manner while preventing the airbag 10 from bursting out toward the occupant. Furthermore, it is possible to safely restrain and protect the occupant with the airbag 10. By using the airbag device 1A, it is possible to protect the occupant in various states, corresponding to differences in states of the occupant seated in the driver's seat.

FIG. 6 includes side views illustrating the airbag device 1A protecting an occupant. FIG. 6 illustrates two occupants 91 (91A and 91B) having different body sizes.

When the large occupant 91A (see FIG. 6A) is seated in a driver's seat 92, the occupant 91A situates the driver's seat 92 on the rear side in the vehicle. The distance, L1, between the occupant 91A and the airbag device 1A is large. When the small occupant 91B (see FIG. 6B) is seated in the driver's seat 92, the occupant 91B situates the driver's seat 92 on the front side in the vehicle. The distance, L2, between the occupant 91B and the airbag device 1A is small. Therefore, the small occupant 91B comes into contact with the airbag 10 in a shorter time than the large occupant 91A.

As has been described above, dangerous bursting out of the airbag 10 (indicated with dashed lines in FIGS. 6C and 6D) is prevented. The airbag 10 gradually inflates in the occupant direction while maintaining the front surface thereof flat. Therefore, the airbag 10 appropriately receives and protects the occupant 91A or 91B, without damaging the occupant 91A or 91B by bursting out. At this time, the large occupant 91A (see FIG. 6C) comes into contact with and is protected by the properly inflated and deployed airbag 10.

The small occupant 91B (see FIG. 6D) comes into contact with the airbag 10 that is in the middle of inflation and deployment. The occupant 91B comes into contact with the sufficiently inflated, flat airbag 10. Therefore, the occupant 91B is more safely protected by the airbag 10. In this manner, because the necessary absorbing stroke of the airbag 10 can be ensured regardless of the state of the occupant 91, it is possible to protect the occupant 91 without damage. Because this airbag 10 has high ability to restrain the occupant 91, and in particular, high initial restraint performance, it is possible to safely restrain the occupant 91 in various states.

Because the inflation of the outer bag 20 in the occupant direction is restricted by the restriction member 40A, the outer bag 20 inflates preferentially sideways. Therefore, even when the occupant 91 is away from the driver's seat 92 and is near the airbag 10, damage to the occupant 91 due to bursting out of the airbag 10 can be suppressed. When the occupant 91 is in tight contact with the steering wheel 90, a small space is created between the occupant 91 and the steering wheel 90 because of the inflation of the inner bag 30A. The outer bag 20 inflates sideways from this space. The airbag 10 deploys between the occupant 91 and the steering wheel 90. The occupant 91 is protected by the airbag 10.

The outer bag 20 quickly inflates sideways and deploys over a wide area in a short time. Therefore, even when the occupant 91 advances into the airbag 10 at high speed, the occupant 91 can be reliably received by the airbag 10. When the occupant 91 advances into the airbag 10 that is in the middle of deployment, the occupant 91 is received by the inner bag 30A having high internal pressure. The inner bag 30A absorbs the impact and energy of the occupant 91. Furthermore, the inner bag 30A prevents the occupant 91 from touching the steering wheel 90.

The thickness of the airbag 10 at the initial stage of deployment is determined by the height of the inflated inner bag 30A. For example, by making the thickness of the airbag 10 at the initial stage of deployment small depending on the distance between the occupant 91 and the airbag device 1A, the risk to the occupant 91 can be reduced. Subsequently, when the opening 41 in the restriction member 40A is disengaged from the inner bag 30A, the outer bag 20 fully inflates to a large thickness. Thus, the airbag 10 obtains the maximum absorbing stroke. The airbag 10 safely receives the occupant 91. The airbag 10 gradually inflates and deploys through stages: the inner bag 30A inflates, the outer bag 20 inflates sideways, and the outer bag 20 fully inflates. Because the volume of the airbag 10 increases while maintaining sufficient internal pressure during the above-described process, the airbag 10 exhibits high occupant restraint performance.

The deployment performance of the airbag 10 can be finely adjusted by changing the size of the inflated inner bag 30A, the size of the opening 41 in the restriction member 40A, the length of the restriction member 40A, or the connecting position of the restriction member 40A. Because these changes can be made relatively easily, the deployment performance and deployment manner of the airbag 10 can be easily adjusted. Note that the restriction member 40A may be formed in a shape other than the rectangular shape (e.g., a circular shape or a triangular shape). The restriction member 40A may be formed in a ring shape. The inner bag 30A may be formed in any shape (e.g., a ball shape, an ellipsoidal shape, or a pyramid shape). A plurality of embodiments in which the shape of the restriction member 40 or the inner bag 30 is changed will be described below.

Second Embodiment

Figure 7:
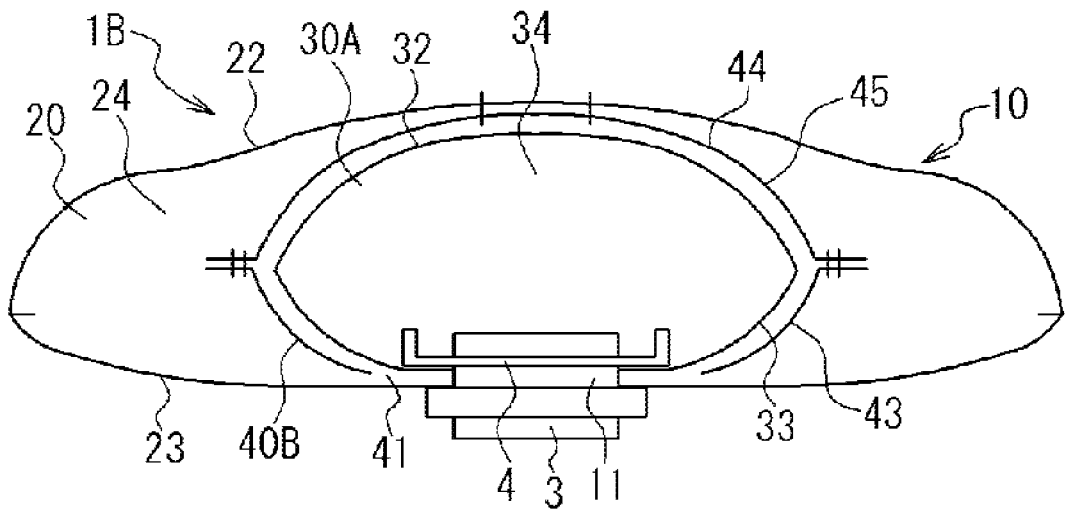
FIG. 7 is a diagram illustrating an airbag device according to a second embodiment.
Figure 8:
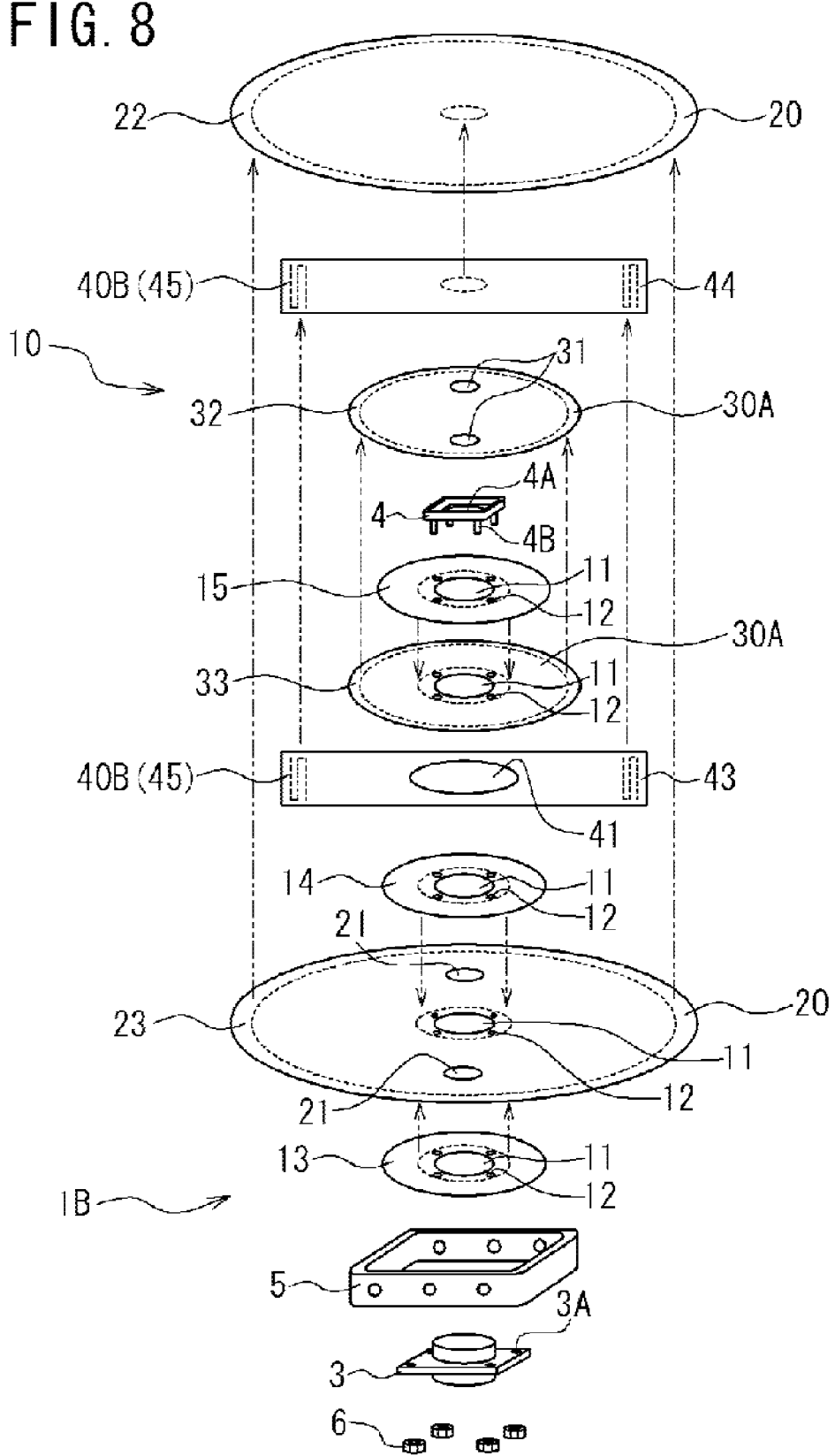
FIG. 8 is an exploded perspective view of the airbag device in FIG. 7.

FIG. 7 is a diagram illustrating an airbag device 1 according to a second embodiment (hereinbelow, an "airbag device 1B"). FIG. 7 schematically illustrates the airbag device 1B as viewed from the arrow X direction in FIG. 1. Furthermore, FIG. 7 illustrates the airbag 10 at the initial stage of deployment in cross-section. FIG. 8 is an exploded perspective view of the airbag device 1B in FIG. 7. FIG. 8 illustrates components of the airbag device 1B spaced apart in the up-down direction. FIG. 8 also illustrates, with arrows, the relationships between the components to be combined and the positions where the components are combined. FIGS. 7 and 8 correspond to FIGS. 2 and 3, respectively, which are described in the first embodiment.

This airbag device 1B differs from the airbag device 1A according to the first embodiment in the restriction member 40 (hereinbelow, the restriction member according to this embodiment will be denoted by 40B). Herein, the components that are the same as those of the airbag device 1A described above will be called by the same names and denoted by the same reference numerals, and descriptions thereof will be omitted. The restriction member 40B will be described in detail below.

As illustrated in the figures, the restriction member 40B includes a first fabric piece 43 located on the vehicle body side and a second fabric piece 44 located on the occupant side. The first fabric piece 43 and the second fabric piece 44 are rectangular base fabric pieces (belt-shaped fabric pieces) and are formed in the same shape. The first fabric piece 43 has the same configuration as the above-described belt-shaped member 42 of the restriction member 40A. The first fabric piece 43 has the opening 41 at the center thereof. Note that the ends of the first fabric piece 43 are joined to the ends of the second fabric piece 44, not to the front surface of the outer bag 20 (front base fabric piece 22). The ends of the first fabric piece 43 and the ends of the second fabric piece 44 are joined by stitching. The first fabric piece 43 and the second fabric piece 44 are formed in a ring shape. The second fabric piece 44 is stitched to the front surface of the outer bag 20, thereby connecting the first fabric piece 43 to the front surface of the outer bag 20. The second fabric piece 44 and the front surface of the outer bag 20 are stitched together along a circular stitch line at their centers.

Figure 9:
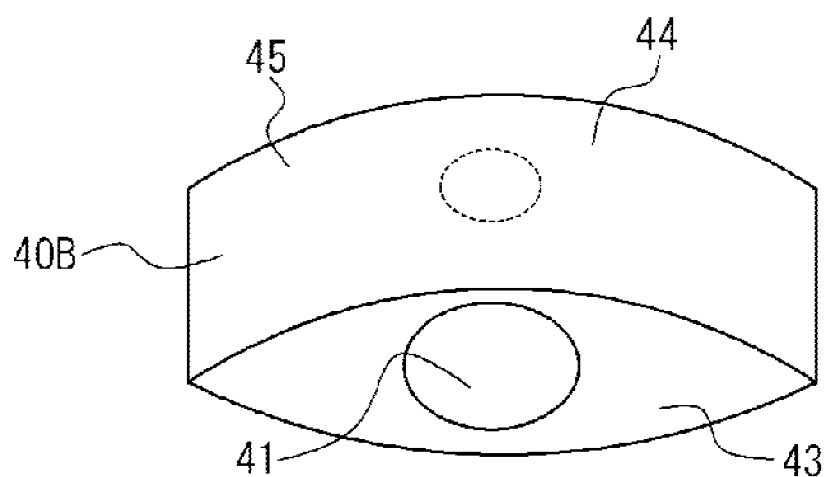
FIG. 9 is a perspective view of a restriction member according to the second embodiment.

FIG. 9 is a perspective view of the restriction member 40B according to the second embodiment.

As illustrated in the figure, the restriction member 40B is composed of a ring-shaped member 45 (Herein, a ring-shaped fabric piece) formed of two base fabric pieces. Before the airbag 10 inflates, the ring-shaped member 45 (see FIGS. 7 and 8) is disposed along the front and rear surfaces of the inner bag 30A (the base fabric pieces 32 and 33) so as to surround the inner bag 30A. More specifically, inside the airbag 10, the first fabric piece 43 is disposed between the rear surface of the inner bag 30A and the rear surface of the outer bag 20. The second fabric piece 44 is disposed between the front surface of the inner bag 30A and the front surface of the outer bag 20.

The inner bag 30A, in a state surrounded by the restriction member 40B, is disposed inside the outer bag 20. A portion of the ring-shaped member 45 disposed along the front surface of the inner bag 30A is joined to the front surface of the outer bag 20. Thus, the restriction member 40B is connected to the front surface of the outer bag 20. When the outer bag 20 inflates, the restriction member 40B restricts the movement of the front surface of the outer bag 20 in the occupant direction.

The opening 41 in the restriction member 40B has the same configuration as the above-described opening 41 in the restriction member 40A. The opening 41 is disposed between the rear surface of the inner bag 30A and the rear surface of the outer bag 20. When the airbag 10 inflates, the opening 41 is engaged with the inflated inner bag 30A. As the outer bag 20 inflates, the first fabric piece 43 of the restriction member 40B is pulled by the front surface of the outer bag 20 with the intermediary of the second fabric piece 44. Due to this tension, the opening 41 gradually moves in the occupant direction along the outer circumference of the inner bag 30A. The restriction member 40B moves the front surface of the outer bag 20 in the occupant direction in accordance with the movement of the opening 41.

Next, a manufacturing process of the airbag device 1B (see FIG. 8) will be described.

The first fabric piece 43 and the second fabric piece 44 are stitched together (in FIG. 8, dashed lines indicate stitching portions) to form the ring-shaped restriction member 40B. Concerning the outer bag 20, first, two reinforcing fabric pieces 13 and 14 are stitched to the inner and outer surfaces of the rear base fabric piece 23. Furthermore, the second fabric piece 44 of the restriction member 40B is stitched to the inner surface of the front base fabric piece 22. Next, the base fabric pieces 22 and 23 are stacked such that the outer surfaces thereof are face-to-face. The base fabric pieces 22 and 23 are stitched together along the outer circumferences thereof. Then, the base fabric pieces 22 and 23 are turned inside out through the attachment opening 11. The restriction member 40B is disposed inside the outer bag 20. Note that FIG. 8 illustrates the arrangement of the components after the outer bag 20 and the inner bag 30A are turned inside out.

The inner bag 30A is formed by the same process as that according to the first embodiment. Then, the inner bag 30A is inserted into the outer bag 20 through the attachment opening 11 in the outer bag 20. At this time, the inner bag 30A is arranged inside the restriction member 40B. The inner bag 30A is disposed concentrically with the outer bag 20. Next, in the same way as above, the airbag 10 and the inflator 3 are attached to the reaction plate 5, using the cushion ring 4 and the locknuts 6. The airbag cover 2 (not shown in FIG. 8) is attached to the reaction plate 5. In this way, the manufacturing of the airbag device 1B is completed. The airbag device 1B inflates and deploys the airbag 10 with the gas generated by the inflator 3.

FIG. 10 includes cross-sectional views illustrating, in sequence, stages of inflation and deployment of the airbag 10. FIG. 10 illustrates the respective stages of the airbag 10 corresponding to FIG. 7.

Note that the airbag 10 inflates and deploys through basically the same process as that in the first embodiment. Accordingly, herein, inflation and deployment of the airbag 10 will be briefly described.

Figure 10A:
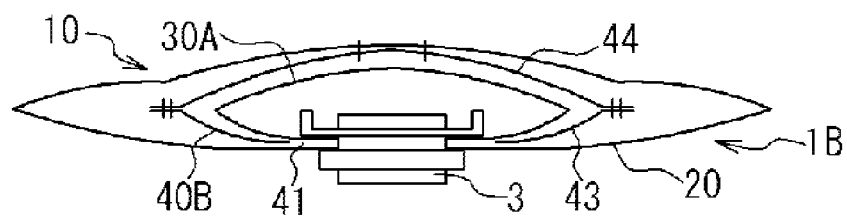
FIG. 10 includes cross-sectional views illustrating, in sequence, stages of inflation and deployment of an airbag.
Figure 10B:
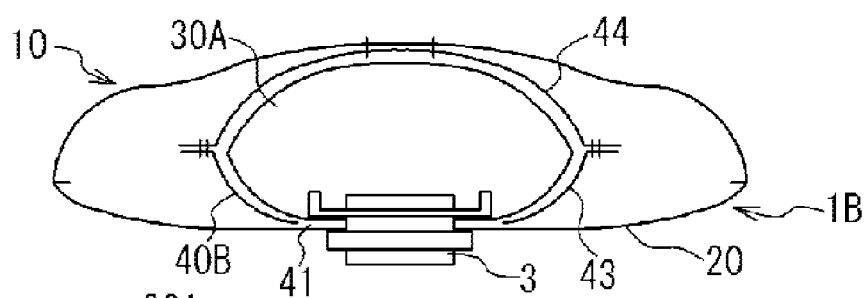
Figure 10C:
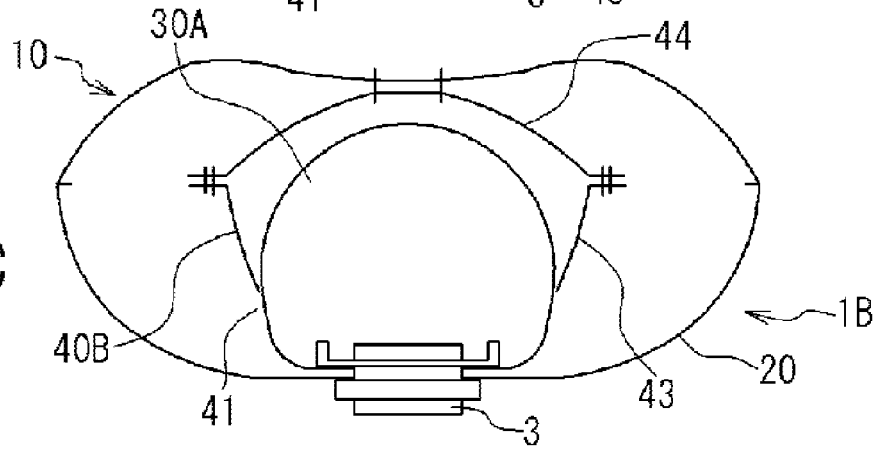

At the initial stage of deployment of the airbag 10, first, the inner bag 30A inflates within the restriction member 40B (see FIG. 10A). The opening 41 in the restriction member 40B is engaged with the inflated inner bag 30A (see FIG. 10B). The first fabric piece 43 of the restriction member 40B is pressed against the rear surface of the inner bag 30A. In this state, the restriction member 40B is retained by the rear surface of the inner bag 30A. Furthermore, the restriction member 40B applies tension to the front surface of the outer bag 20 with the second fabric piece 44. The restriction member 40B pulls the front surface of the outer bag 20 to a direction opposite to the occupant direction (vehicle body direction). The restriction member 40B prevents the front surface of the outer bag 20 from moving in the occupant direction. As a result, inflation and bursting out of the inner bag 30A in the occupant direction are suppressed. The inner bag 30A inflates more largely sideways than in the occupant direction. Furthermore, because the inner bag 30A inflates within the ring-shaped restriction member 40B, the size and shape of the inflated inner bag 30A are limited by the restriction member 40B.

The outer bag 20 starts to inflate with the gas supplied through the flow ports 31 provided in the inner bag 30A. At this time, because the inflation of the outer bag 20 in the occupant direction is restricted by the restriction member 40B, the outer bag 20 inflates preferentially sideways. Next, as the internal pressure increases, the outer bag 20 inflates in the occupant direction. The thickness of the outer bag 20 increases. Once the inner bag 30A has completed inflation, it discharges the gas through the flow ports 31. The inner bag 30A gradually contracts (see FIG. 10C). During this, the restriction member 40B is pulled by the outer bag 20. The opening 41 moves in the occupant direction while receiving the resistance from the contracting inner bag 30A. As the outer bag 20 inflates, the opening 41 gradually moves in the occupant direction along the outer circumference of the inner bag 30A.

Figure 10D:
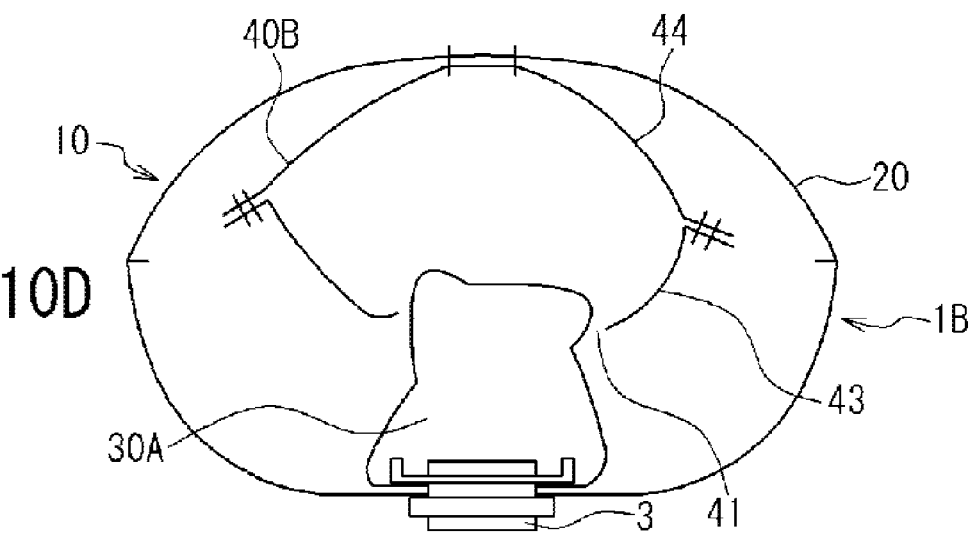

Then, when the opening 41 is disengaged from the inner bag 30A, the inner bag 30A moves out of the restriction member 40B (see FIG. 10D). As a result, the restriction of the outer bag 20 by the restriction member 40B is removed. The outer bag 20 inflates in the occupant direction and fully inflates and deploys in front of the occupant 91. In this manner, the restriction member 40B moves the front surface of the outer bag 20 in the occupant direction along with the movement of the opening 41. The restriction member 40B restricts the movement of the front surface of the outer bag 20 in the occupant direction. The airbag device 1B receives the occupant 91 with the inflated and deployed airbag 10.

This airbag device 1B provides the same advantages as those achieved by the airbag device 1A according to the first embodiment. Furthermore, because the restriction member 40B is formed of the ring-shaped member 45 surrounding the inner bag 30A, it is possible to restrict the movement of the front surface of the inner bag 30A and the inflation of the inner bag 30A with the restriction member 40B (second fabric piece 44). Note that the restriction member 40B is formed in a ring shape by joining the two fabric pieces, 43 and 44. However, the restriction member 40B may be formed in a ring shape by, for example, joining ends of a belt-shaped fabric piece. The restriction member 40B may be joined to the front surface of the outer bag 20 at one or more locations. Herein, the opening 41 is formed in the restriction member 40B in advance. Alternatively, the opening 41 may be provided in the restriction member 40B when the airbag 10 inflates and deploys, as will be described below.

Third Embodiment

Figure 11:
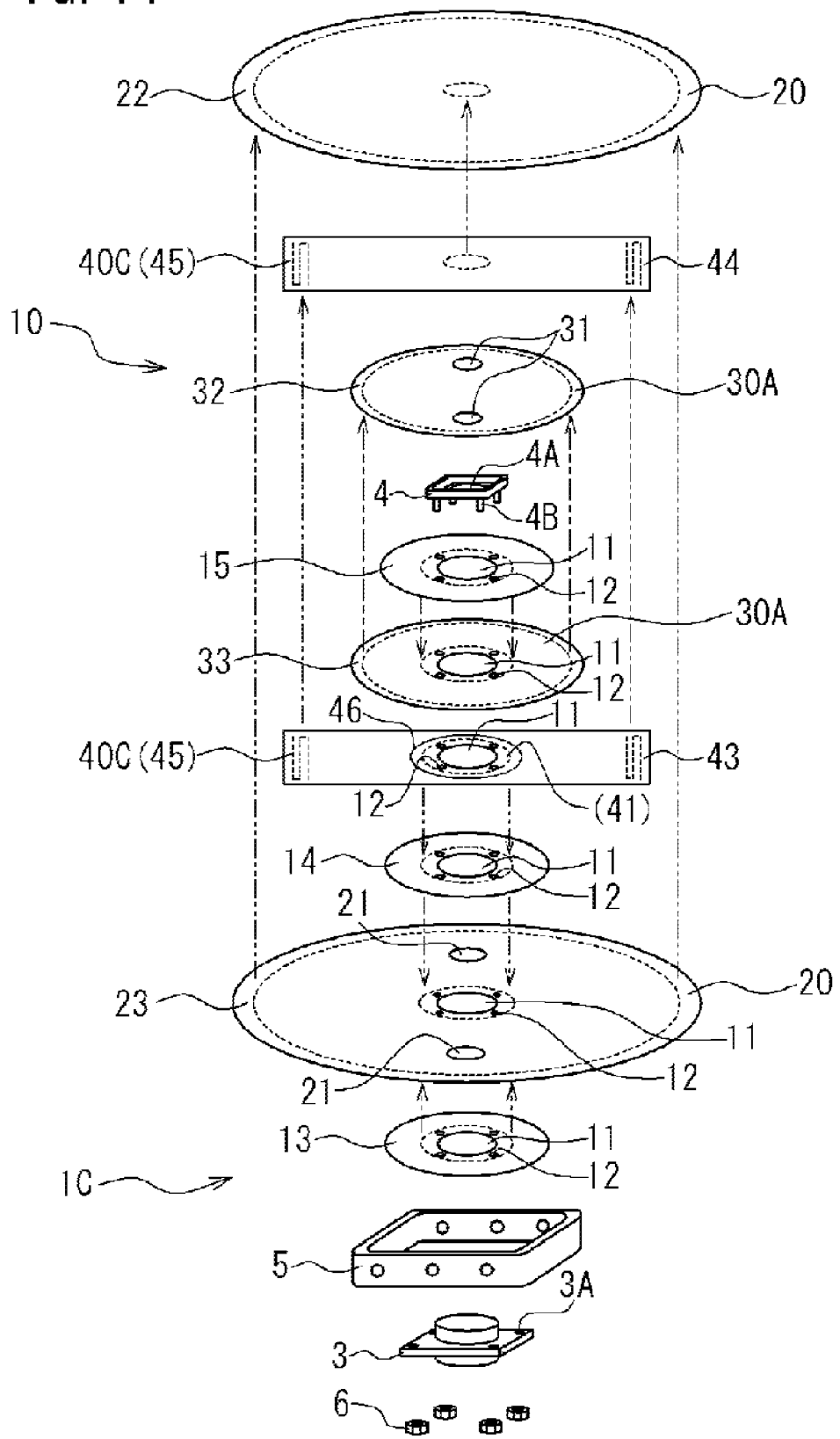
FIG. 11 is a diagram illustrating an airbag device according to a third embodiment.

FIG. 11 is a diagram illustrating an airbag device 1 according to a third embodiment (hereinbelow, an "airbag device 1C"). FIG. 11 is an exploded perspective view of the airbag device 1C corresponding to FIG. 8.

A portion of the restriction member 40 of the airbag device 1C (hereinbelow, the restriction member according to this embodiment will be denoted by 40C) differs from the restriction member 40B according to the second embodiment.

As illustrated in the figure, the restriction member 40C has the attachment opening 11 for the inflator 3 and the insertion holes 12. The attachment opening 11 and the insertion holes 12 are provided at the center of the first fabric piece 43, instead of the opening 41. The restriction member 40C has a tearable portion 46 around the attachment opening 11. The tearable portion 46 is formed of, for example, a perforated line or a weakened line. The tearable portion 46 is formed in a circular shape having the same size as the opening 41. A portion on the inner side of the tearable portion 46 of the restriction member 40C is disposed and is fixed between the cushion ring 4 and the reaction plate 5, similarly to the reinforcing fabric piece 14 and the rear base fabric piece 33 of the inner bag 30A. The tearable portion 46 is torn by a force generated by the inflating outer bag 20 pulling the restriction member 40C. As a result, the portion within the tearable portion 46 is separated from the restriction member 40C. The opening 41 is provided in the restriction member 40C.

Next, a manufacturing process of the airbag device 1C will be described.

Concerning the outer bag 20, first, one of the reinforcing fabric pieces, 13, is overlaid on the outer surface of the rear base fabric piece 23. The other of the reinforcing fabric pieces, 14, and the first fabric piece 43 of the restriction member 40C are overlaid on the inner surface of the rear base fabric piece 23. In this state, the four fabric pieces 13, 23, 14, and 43 are stitched together (in FIG. 11, dashed lines indicate the stitching portions). The second fabric piece 44 of the restriction member 40C is stitched to the inner surface of the front base fabric piece 22. Next, the base fabric pieces 22 and 23 are stacked such that the outer surfaces thereof are face-to-face, and the base fabric pieces 22 and 23 are stitched together along the outer circumferences thereof. The first fabric piece 43 and the second fabric piece 44 are stitched together, with the base fabric pieces 22 and 23 being sandwiched therebetween. Thus, the ring-shaped restriction member 40C is formed. Then, the base fabric pieces 22 and 23 and the restriction member 40C are turned inside out through the attachment opening 11. The restriction member 40C is disposed inside the outer bag 20. Note that FIG. 11 illustrates the arrangement of the components after the outer bag 20 and the inner bag 30A are turned inside out.

The inner bag 30A, after being formed, is inserted into the outer bag 20. The inner bag 30A is arranged inside the restriction member 40C. Next, in the same way as above, the airbag 10 and the inflator 3 are attached to the reaction plate 5, using the cushion ring 4 and the locknuts 6. The airbag cover 2 (not shown in FIG. 11) is attached to the reaction plate 5. In this way, the manufacturing of the airbag device 1C is completed.

This restriction member 40C is joined to the rear base fabric piece 23 of the outer bag 20 in advance and is temporarily fastened thereto with the cushion ring 4. In this state, the restriction member 40C is fixed to the reaction plate 5. Thus, the restriction member 40C can be easily attached to the airbag 10. Moreover, the productivity of the airbag 10 can be improved. Furthermore, the restriction member 40C can be precisely disposed in the airbag 10. The tearable portion 46 may be provided in the restriction member 40A according to the first embodiment.

Fourth Embodiment

Figure 12:
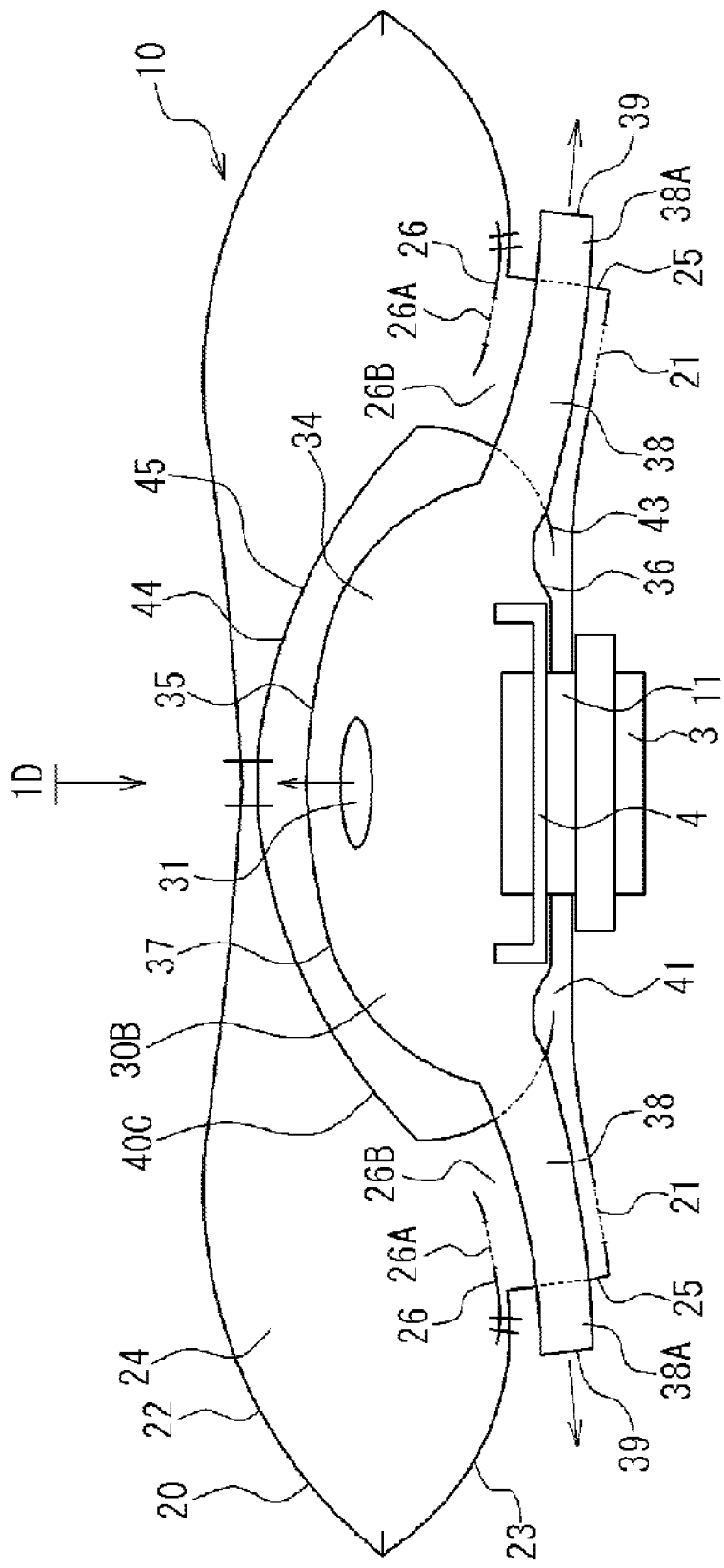
FIG. 12 is a diagram illustrating an airbag device according to a fourth embodiment.
Figure 13:
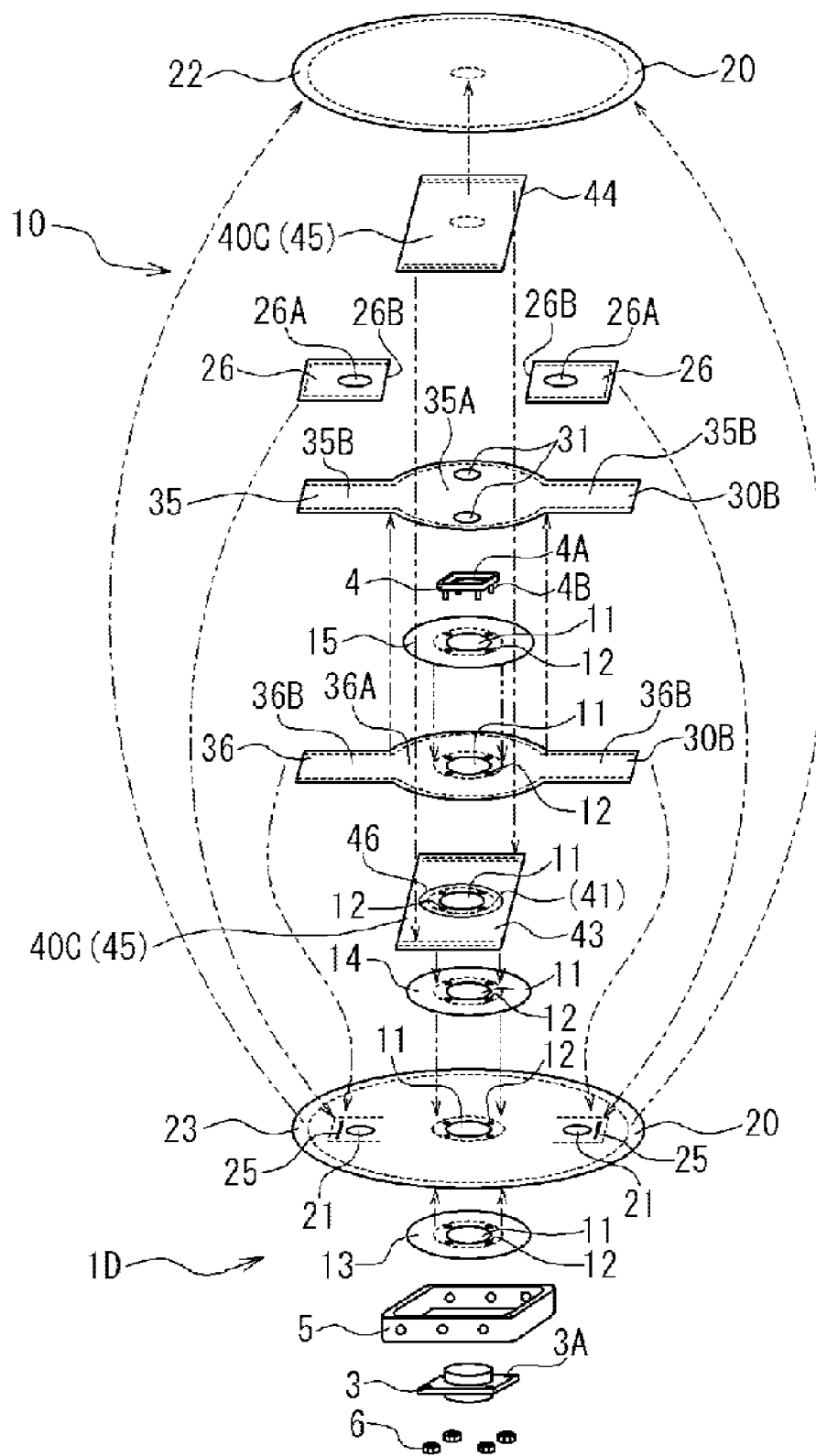
FIG. 13 is an exploded perspective view of an airbag device in FIG. 12.

FIG. 12 is a diagram illustrating an airbag device 1 according to a fourth embodiment (hereinbelow, an "airbag device 1D"). FIG. 12 schematically illustrates the airbag device 1D as viewed from the arrow X direction in FIG. 1. Furthermore, FIG. 12 illustrates the airbag 10 at the initial stage of deployment in cross-section. FIG. 13 is an exploded perspective view of the airbag device 1D in FIG. 12. FIG. 13 illustrates components of the airbag device 1D spaced apart in the up-down direction. FIG. 13 also illustrates, with arrows, the relationships between the components to be combined and the positions where the components are combined.

This airbag device 1D differs from the airbag device 1C according to the third embodiment (see FIG. 11) in the inner bag 30 (hereinbelow, the inner bag according to this embodiment will be denoted by 30B). Herein, the components that are the same as those of the airbag device 1C described above will be called by the same names and denoted by the same reference numerals, and descriptions thereof will be omitted. The difference regarding the inner bag 30B will be described in detail below. The outer bag 20 is also partially changed corresponding to the change made to the inner bag 30B.

As illustrated in the figure, the inner bag 30B has a front base fabric piece 35 and a rear base fabric piece 36. The front base fabric piece 35 is provided with gas flow ports 31. The rear base fabric piece 36 is provided with the attachment opening 11 for the inflator 3. The base fabric pieces 35 and 36 are formed in the same shape. The base fabric pieces 35 and 36 are formed of circular portions 35A and 36A and at least one (in this embodiment, two) rectangular portions 35B and 36B. The two rectangular portions 35B and 36B are provided integrally with the outer circumferences of the circular portions 35A and 36A so as to extend from the circular portions 35A and 36A in opposite directions.

The base fabric pieces 35 and 36 are stitched together along the edges. The circular portions 35A and 36A and the rectangular portions 35B and 36B are joined to each other. The air chamber 34 formed of the base fabric pieces 35 and 36 is formed inside the inner bag 30B. The inner bag 30B has a ball-shaped inflation portion (main inflation portion) 37 and tubular inflation portions 38. The ball-shaped inflation portion 37 is formed of the circular portions 35A and 36A. The tubular inflation portions 38 are formed of the rectangular portions 35B and 36B. The inside of the ball-shaped inflation portion 37 and the inside of the tubular inflation portions 38 communicate with each other and form the air chamber 34.

Figure 14A:
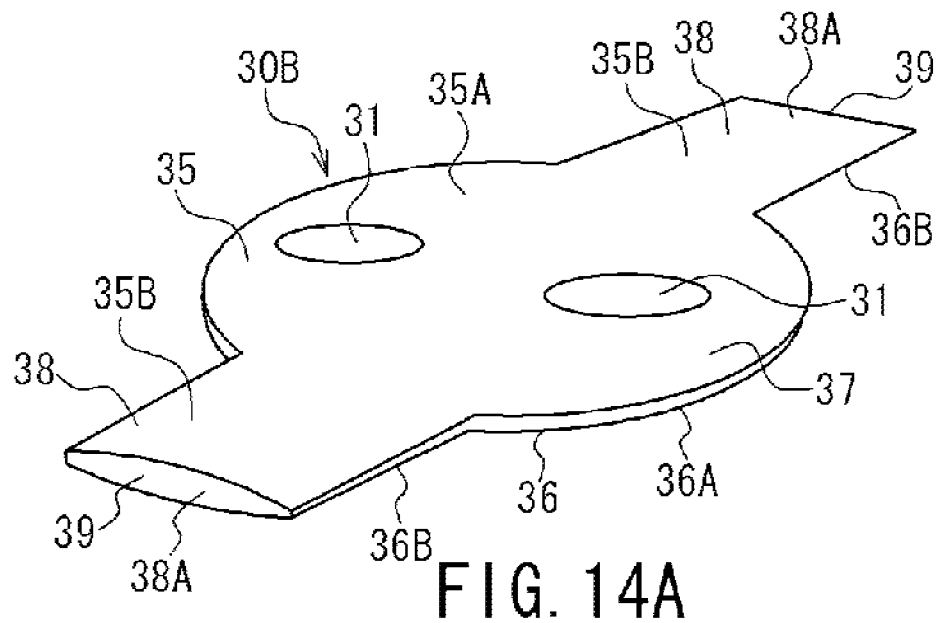
FIG. 14 includes perspective views of an inner bag according to the fourth embodiment.
Figure 14B:
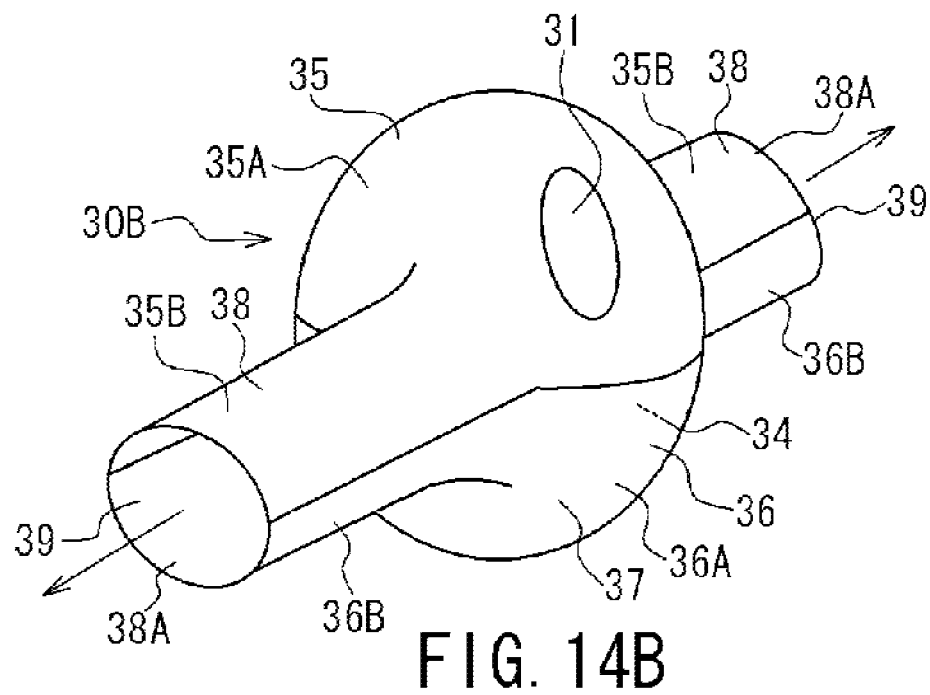

FIG. 14 includes perspective views of the inner bag 30B. FIG. 14A illustrates the inner bag 30B before inflating. FIG. 14B illustrates the inflated inner bag 30B.

As illustrated in FIG. 14A, the inner bag 30B before inflating has a flat shape. The front base fabric piece 35 and the rear base fabric piece 36 are stacked on top of each other. As illustrated in FIG. 14B, the inflated inner bag 30B has a three-dimensional shape. The air chamber 34 inside the base fabric pieces 35 and 36 is filled with the gas. At this time, the ball-shaped inflation portion 37 inflates into a ball shape with the gas supplied from the inflator 3, at the center of the inner bag 30B. The tubular inflation portions 38 inflate into a tubular shape with the gas supplied from the ball-shaped inflation portion 37, starting from the ball-shaped inflation portion 37 to the outer side.

As described above, the inner bag 30B has the ball-shaped inflation portion 37 and the tubular inflation portions 38 that are contractible or deformable from the inflated state. At least one tubular inflation portion 38 is provided on the inner bag 30B. When inflated, the tubular inflation portions 38 project toward the outer side of the inner bag 30B. In this embodiment, two tubular inflation portions 38 project sideways, in opposite directions, from the inner bag 30B. The inner bag 30B has discharge ports 39 at ends 38A of the tubular inflation portions 38. The gas inside the inner bag 30B is discharged outside the inner bag 30B through the discharge ports 39. The discharge ports 39 are unjoined portions provided at the ends of the tubular inflation portions 38. The discharge ports 39 are formed by leaving the ends of the rectangular portions 35B and 36B unstitched. The gas is discharged sideways from the inner bag 30B through the discharge ports 39. The inner bag 30B discharges the gas generated by the inflator 3 through the discharge ports 39. The gas is discharged through the tubular inflation portions 38.

Before the airbag 10 inflates, the ends 38A of the tubular inflation portions 38 (see FIGS. 12 and 13) are allowed to pass through the passing holes 25 provided in the outer bag 20. The ends 38A are disposed outside the outer bag 20 through the passing holes 25. The passing holes 25 are slits provided in the rear base fabric piece 23 of the outer bag 20. The passing holes 25 are located near the vent holes 21. Furthermore, the passing holes 25 are provided on the outer side of the two vent holes 21 in the rear base fabric piece 23. The ends 38A of the tubular inflation portions 38 are allowed to pass through the passing holes 25 from the inside of the outer bag 20 and are disposed outside the outer bag 20. Hence, the discharge ports 39 of the tubular inflation portions 38 are disposed outside the outer bag 20. The inner bag 30B discharges the gas inside it to the outside of the outer bag 20 through the discharge ports 39.

Inside the outer bag 20, the tubular inflation portions 38 are overlaid on the vent holes 21 such that the ends 38A thereof are disposed outside the outer bag 20. Thus, the tubular inflation portions 38 cover the entire vent holes 21. The vent holes 21 are closed by the tubular inflation portions 38. The tubular inflation portions 38 prevent the gas from being discharged through the vent holes 21. The inner bag 30B (see FIG. 13) is disposed so as to cross the restriction member 40C. The ball-shaped inflation portion 37 is surrounded by the restriction member 40C. In this state, the tubular inflation portions 38 are disposed so as to extend to the outer side of the restriction member 40C through side openings in the restriction member 40C.

As will be described below, when the opening 41 in the restriction member 40C moves in the occupant direction, the tubular inflation portions 38 are pulled by the restriction member 40C and pass through the opening 41. At this time, the restriction member 40C pulls the ends 38A of the tubular inflation portions 38 into the outer bag 20 through the passing holes 25. When the ends 38A are pulled into the outer bag 20, the tubular inflation portions 38 open the vent holes 21.

The outer bag 20 has, inside thereof, vent hole covers (hereinbelow, "covers") 26. The covers 26 overlie the vent holes 21. The covers 26 have through-holes 26A through which the gas passes. The covers 26 are formed of rectangular base fabric pieces and are disposed around the vent holes 21. The covers 26 are disposed so as to cover the vent holes 21 and the passing holes 25. Outer edges of the covers 26 are joined to the inner surface of the rear base fabric piece 23. However, portions of the covers 26 on the inner bag 30B side are not joined thereto. In this way, unjoined portions 26B are provided in the covers 26.

The ends 38A of the tubular inflation portions 38 are inserted between the rear base fabric piece 23 and the covers 26 from the unjoined portions 26B. Furthermore, the ends 38A are disposed outside the outer bag 20 through the passing holes 25. In this state, the vent holes 21 are closed by the tubular inflation portions 38. The tubular inflation portions 38 are pulled into the outer bag 20 through the unjoined portions 26B. As a result, the vent holes 21 are opened. When the vent holes 21 are opened, the through-holes 26A overlap the vent holes 21. The gas is discharged through the through-holes 26A and the vent holes 21. When the tubular inflation portions 38 have passed through the passing holes 25, the covers 26 overlie the rear base fabric piece 23. The passing holes 25 are closed by the covers 26.

Next, a manufacturing process of the airbag device 1D (see FIG. 13) will be described.

The outer bag 20 and the restriction member 40C are formed by the same process as that in the third embodiment. However, before the base fabric pieces 22 and 23 constituting the outer bag 20 are stitched together (in FIG. 13, dashed lines indicate stitching portions), the two covers 26 are stitched to the rear base fabric piece 23. Concerning the inner bag 30B, first, the protection fabric piece 15 is stitched to the inner surface of the rear base fabric piece 36. Next, the base fabric pieces 35 and 36 are stacked such that the outer surfaces thereof are face-to-face. The base fabric pieces 35 and 36 are stitched together along the side edges thereof. Then, the base fabric pieces 35 and 36 are turned inside out through the attachment opening 11. The tubular inflation portions 38 are disposed so as to project outward. Note that FIG. 13 illustrates the arrangement of the components after the inner bag 30B is turned inside out.

Next, the inner bag 30B is inserted into the outer bag 20. The inner bag 30B is arranged inside the restriction member 40C. The two ends 38A of the tubular inflation portions 38 are inserted into the unjoined portions 26B of the covers 26. The ends 38A are disposed outside the outer bag 20 through the passing holes 25. Next, in the same way as above, the airbag 10 and the inflator 3 are attached to the reaction plate 5, using the cushion ring 4 and the locknuts 6. The airbag cover 2 (not shown in FIG. 13) is attached to the reaction plate 5. In this way, the manufacturing of the airbag device 1D is completed. The airbag device 1D inflates and deploys the airbag 10 with the gas generated by the inflator 3.

FIGS. 15 and 16 include cross-sectional views illustrating, in sequence, stages of inflation and deployment of the airbag 10. FIGS. 15 and 16 illustrate the respective stages of the airbag 10 corresponding to FIG. 12.

Note that the airbag 10 inflates and deploys through basically the same process as those in the second and third embodiments. Accordingly, herein, inflation and deployment of the airbag 10 will be described, with the focus being on the process that is different from the process described above.

Figure 15A:
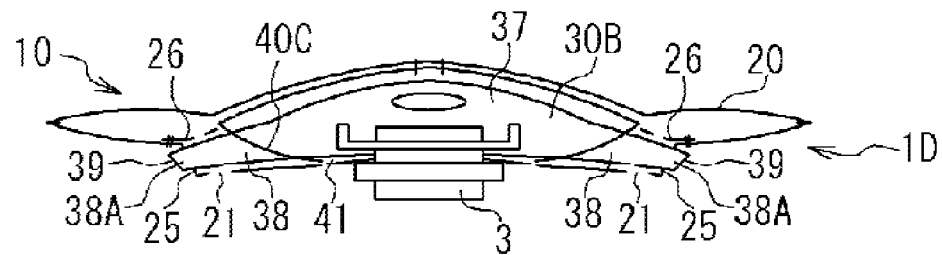
FIG. 15 includes cross-sectional views illustrating, in sequence, stages of inflation and deployment of an airbag.
Figure 15B:
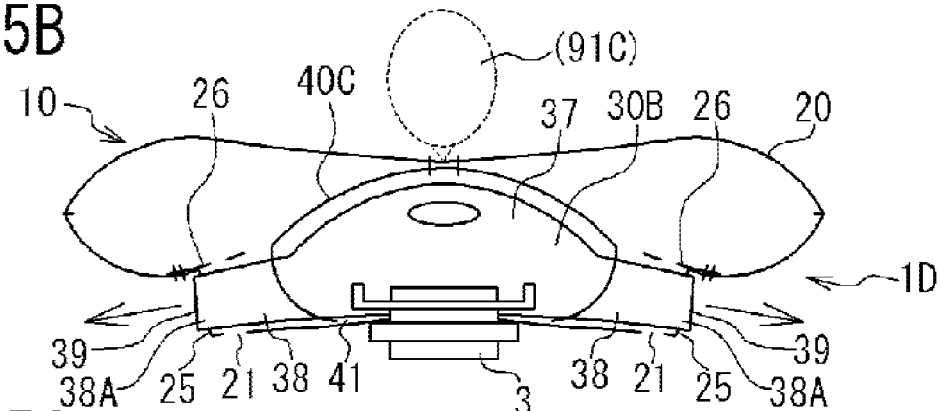
Figure 15C:
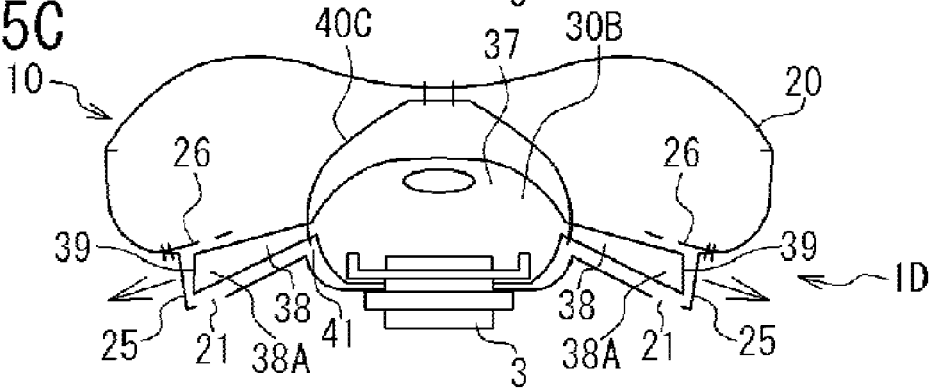
Figure 15D:
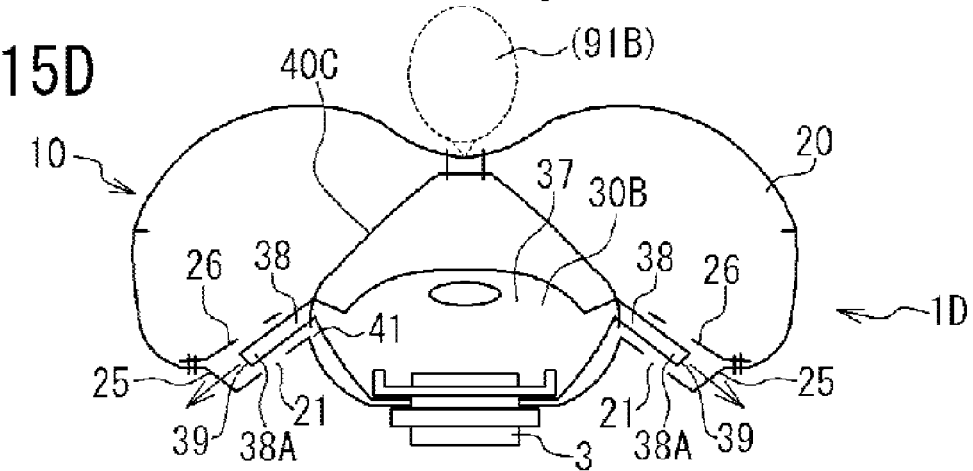
Figure 16A:
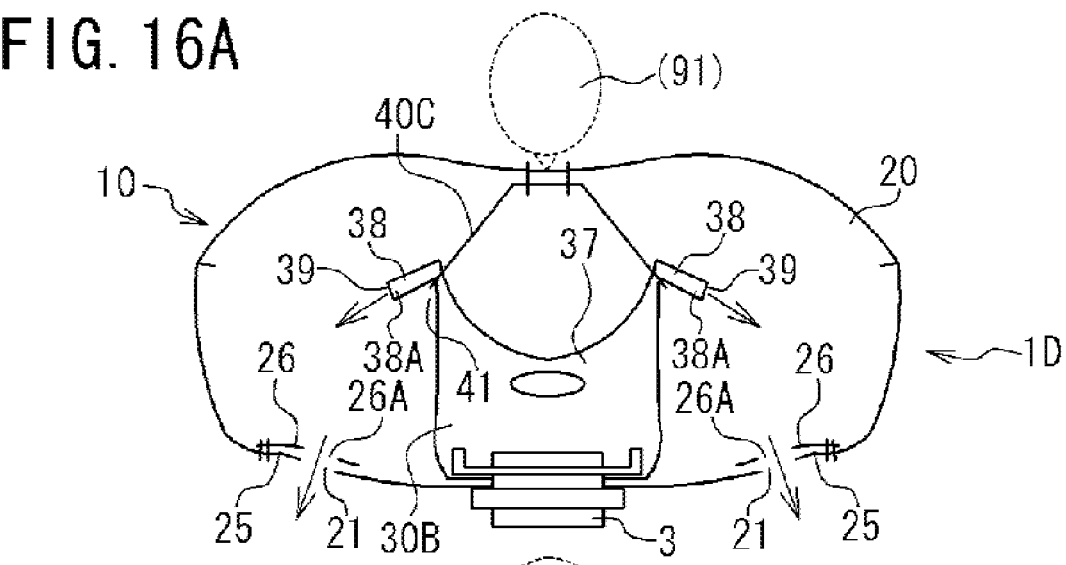
FIG. 16 includes cross-sectional views illustrating, in sequence, stages of inflation and deployment of an airbag.
Figure 16B:
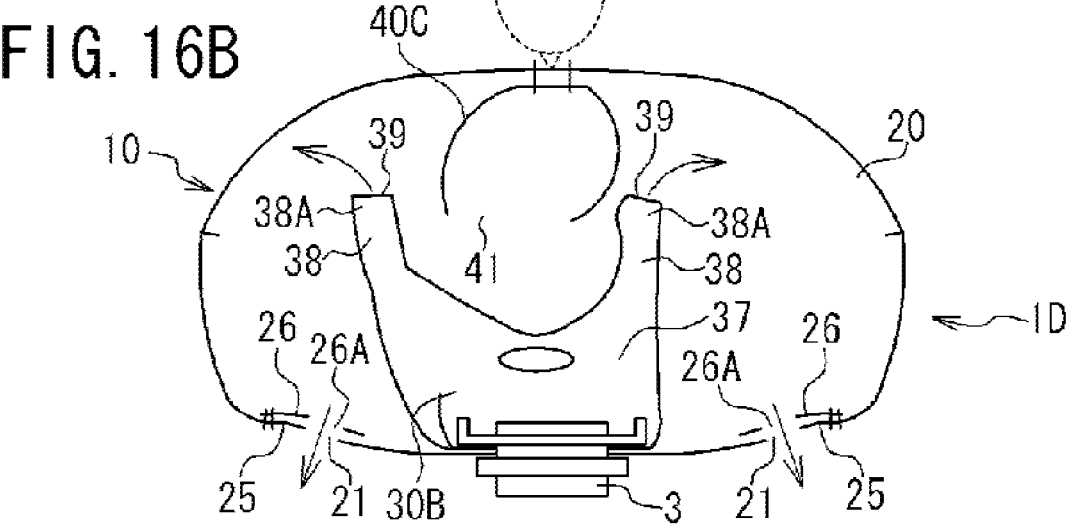
Figure 17A:
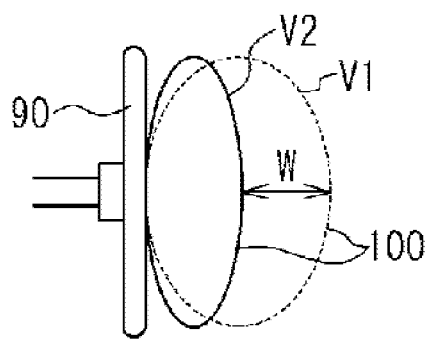
FIG. 17 includes side views illustrating a bouncing conventional airbag.
Figure 17B:
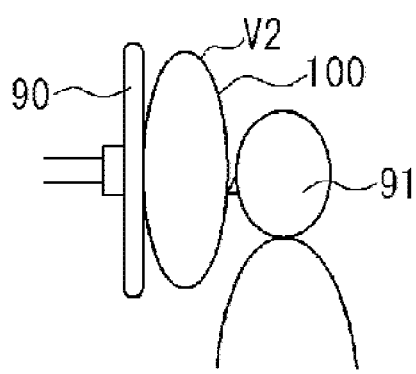

At the initial stage of deployment of the airbag 10, first, the inner bag 30B inflates within the outer bag 20 (see FIG. 15A). At this time, the ball-shaped inflation portion 37 inflates inside the restriction member 40C. The tubular inflation portions 38 inflate starting from portions located inside the outer bag 20 to the ends 38A located outside the outer bag 20. The tubular inflation portions 38 expand the passing holes 25 in the outer bag 20. The discharge ports 39 in the tubular inflation portions 38 are opened. The restriction member 40C is engaged with the ball-shaped inflation portion 37 and the tubular inflation portions 38 of the inflated inner bag 30B (see FIG. 15B). Furthermore, the restriction member 40C is pressed against the rear surface of the ball-shaped inflation portion 37 and is retained by the tubular inflation portions 38. The restriction member 40C is retained by the rear surface of the inner bag 30B.

The restriction member 40C prevents the front surface of the outer bag 20 from moving in the occupant direction. In this state, the inner bag 30B directly discharges the gas generated by the inflator 3 through the discharge ports 39 in the tubular inflation portions 38. The gas inside the inner bag 30B is discharged outside the outer bag 20. The vent holes 21 in the outer bag 20 are kept closed by the tubular inflation portions 38.

The outer bag 20 starts to inflate with the gas supplied through the flow ports 31 in the inner bag 30B. The outer bag 20 inflates in the occupant direction as the internal pressure increases. Due to the gas flowing out of the flow ports 31, the inner bag 30B gradually contracts (see FIG. 15C). During this, the restriction member 40C is pulled by the outer bag 20, tearing the tearable portion 46. As a result, the opening 41 is formed in the restriction member 40C. As the outer bag 20 inflates, the opening 41 gradually moves in the occupant direction along the outer circumference of the inner bag 30B while receiving the resistance from the inner bag 30B.

In accordance with the movement of the opening 41, portions of the tubular inflation portions 38 near the ball-shaped inflation portion 37 are pulled by the restriction member 40C. The tubular inflation portions 38 are gradually pulled toward the restriction member 40C and moved toward the inside of the outer bag 20 (see FIG. 15D). Furthermore, the tubular inflation portions 38 are narrowed by the restriction member 40C and contract. As a result, the amount of gas discharged through the discharge ports 39 gradually decreases. The restriction member 40C moves in the occupant direction while receiving the resistance from the tubular inflation portions 38. Next, the ends 38A of the tubular inflation portions 38 and the discharge ports 39 are pulled into the outer bag 20 (see FIG. 16A) by the restriction member 40C. As a result, the gas is discharged inside the outer bag 20 through the discharge ports 39. The inflation of the outer bag 20 progresses more quickly due to the gas supplied through the discharge ports 39.

When the tubular inflation portions 38 closing the vent holes 21 are removed, the vent holes 21 in the outer bag 20 are opened. When the gas is discharged through the through-holes 26A in the covers 26 and the vent holes 21, the outer bag 20 exhibits predetermined impact absorbing properties. Then, the tubular inflation portions 38 pass through the opening 41. The opening 41 is disengaged from the inner bag 30B (see FIG. 16B). Thus, the restriction of the outer bag 20 by the restriction member 40C is removed. The outer bag 20 inflates in the occupant direction and fully inflates and deploys in front of the occupant 91. The airbag device 1D receives the occupant 91 with the inflated and deployed airbag 10.

This airbag device 1D provides the same advantages as those achieved by the airbag devices 1A to 1C according to the above-described embodiments. Furthermore, because the force applied to the restriction member 40C by the inner bag 30B can be increased by the tubular inflation portions 38, the movement of the front surface of the outer bag 20 can be more reliably restricted by the restriction member 40C. When the restriction member 40C pulls the ends 38A of the tubular inflation portions 38 into the outer bag 20, a pulling force is applied to the restriction member 40C. Due to this force, the movement of the restriction member 40C in the occupant direction is suppressed. As a result, the movement of the front surface of the outer bag 20 can be securely restricted by the restriction member 40C.

Because the discharge ports 39 are provided at the ends 38A of the tubular inflation portions 38, the occupants 91 in various states can be safely protected. For example, when an occupant 91C (see FIG. 15B) approaches or comes into contact with the airbag device 1D, the occupant 91C comes into contact with the airbag 10 in an early stage. When the occupant 91C is in an OOP (out of position) state as in this case, the occupant 91C in an abnormal riding position comes into contact with the airbag 10. At this time, the gas generated by the inflator 3 is directly discharged outside the outer bag 20 through the discharge ports 39, thereby suppressing inflation of the airbag 10 toward the occupant side. Because the energy supplied to the airbag 10 is reduced as a result of this, the risk of damaging the occupant 91C with the airbag 10 significantly decreases. In particular, because the gas generated by the inflator 3 has higher initial velocity than the gas discharged through the vent holes 21, the gas is efficiently discharged through the discharge ports 39. Therefore, a large amount of gas can be discharged through the discharge ports 39 in a short time. Furthermore, even if the size of the discharge ports 39 is reduced, a sufficient amount of gas can be discharged.

Accordingly, with this airbag device 1D, damage to the occupant 91C in the OOP state can be suppressed. When the occupant 91B (see FIG. 15D) is small, the occupant 91B is received by the airbag 10 that has inflated to a certain size. By discharging the gas through the discharge ports 39 in the airbag 10 if necessary, the impact to the occupant 91B can be reduced. When the occupant 91 (see FIGS. 16A and 16B) is not in the OOP state, the gas is discharged through the discharge ports 39 into the outer bag 20. As a result, the outer bag 20 quickly inflates. The occupant 91 is protected by the fully inflated and deployed airbag 10. In this manner, by using the airbag device 1D, it is possible to cope with various states of the occupant 91. In this case, there is no need to use a sensor for sensing the state of the occupant 91 or a special inflator for controlling deployment of the airbag 10.

The vent holes 21 in the outer bag 20 are opened when the ends 38A of the tubular inflation portions 38 are pulled into the outer bag 20. As a result, leaking and loss of the gas supplied into the outer bag 20 at the initial stage of deployment of the airbag 10 can be prevented, thereby enabling efficient use of the gas. Because reductions in size and output of the inflator 3 can be achieved by this, the cost of the airbag device 1D can be reduced.

For example, efficient use of the gas can be achieved by reducing the volume of the outer bag 20 or reducing the size of the vent holes 21. However, in such a case, the impact absorbing properties of the airbag 10 may be affected. In contrast, with the airbag device 1D, the volume of the outer bag 20 and the size of the vent holes 21 may be sufficiently large. Depending on the volume of the airbag 10 and the amount of gas discharged from the vent holes 21, the airbag 10 exhibits appropriate impact absorbing properties. Because the covers 26 are provided with through-holes 26A that overlap the vent holes 21, the gas can be reliably discharged through the vent holes 21. As a result, it is possible to ensure the impact absorbing properties required by the airbag 10.

Note that the airbag 10 may be provided with the restriction member 40A according to the first embodiment or the restriction member 40B according to the second embodiment, instead of the restriction member 40C. Furthermore, the ends 38A of the tubular inflation portions 38 may be disposed outside the outer bag 20 through the vent holes 21. When the vent holes 21 are used as passing holes through which the ends 38A pass, the provision of the passing holes 25 is unnecessary. Therefore, the number of procedures and man-hours required to provide the passing holes 25 can be reduced. If there is no need to cope with the occupant 91C in the OOP state, the ends 38A may be joined to eliminate the discharge ports 39 in the tubular inflation portions 38. In such a case, the gas generated by the inflator 3 can be efficiently used because the gas is not discharged outside the outer bag 20. In addition, it is possible to quickly inflate and deploy the airbag 10.

The entire tubular inflation portions 38, including the ends 38A, may be disposed inside the outer bag 20. Also in this configuration, the restriction member 40 can be engaged and held by the tubular inflation portions 38. Furthermore, the restriction member 40C after starting to move receives large resistance from the tubular inflation portions 38. Hence, it is possible to reliably and securely restrict the movement of the front surface of the outer bag 20 via the restriction member 40C. One tubular inflation portion 38 may be provided on the inner bag 30B so as to project from the inner bag 30B in a predetermined direction (for example, to the lower side or upper side). Alternatively, three or more tubular inflation portions 38 may be provided on the inner bag 30B so as to radially protrude from the inner bag 30B. In other words, one or three or more tubular inflation portions 38 may be provided on the inner bag 30B.

REFERENCE SIGNS LIST

1: airbag device;
2: airbag cover;
3: inflator;
4: cushion ring;
5: reaction plate;
6: locknut;
10: airbag;
11: attachment opening;
12: insertion hole;
13: reinforcing fabric piece;
14: reinforcing fabric piece;
15: protection fabric piece;
20: outer bag;
21: vent hole;
22: front base fabric piece;
23: rear base fabric piece;
24: air chamber;
25: passing hole;
26: cover;
30: inner bag;
31: flow port;
32: front base fabric piece;
33: rear base fabric piece;
34: air chamber;
35: front base fabric piece;
36: rear base fabric piece;
37: ball-shaped inflation portion;
38: tubular inflation portion;
39: discharge port;
40: restriction member;
41: opening;
42: belt-shaped member;
43: first fabric piece;
44: second fabric piece;
45: ring-shaped member;
46: tearable portion;
90: steering wheel;
91: occupant; and
92: driver's seat.

The invention claimed is:

1. An airbag device comprising:
an airbag that inflates and deploys with gas to protect an occupant in a vehicle; and
an inflator to supply gas to the airbag,
wherein the airbag includes an inner bag that inflates with the gas supplied from the inflator and has a gas flow port, an outer bag that accommodates the inner bag and inflates with the gas supplied through the flow port in the inner bag, and a restriction member that is connected to a front surface, inside the outer bag, of the outer bag and restricts movement of the front surface in an occupant direction, and
wherein the restriction member has an opening that can be engaged with the outer circumference of the inflated inner bag and can move in the occupant direction along the outer circumference of the inner bag in accordance with the inflation of the outer bag, the restriction member moving the front surface of the outer bag in the occupant direction in accordance with the movement of the opening.

2. The airbag device according to claim 1,
wherein the size of the opening in the restriction member is smaller than the size of the inflated and deployed inner bag, and the opening moves in the occupant direction while receiving resistance from the contracting inner bag.

3. The airbag device according to claim 1,
wherein the opening in the restriction member is disposed, before the airbag inflates, between a rear surface of the inner bag and a rear surface of the outer bag such that the inner bag can pass therethrough.

4. The airbag device according to claim 1,
wherein the restriction member is formed of a belt-shaped member disposed, before the airbag inflates, between the rear surface of the inner bag and the rear surface of the outer bag, and ends of the belt-shaped member are joined to the front surface of the outer bag.

5. The airbag device according to claim 1,
wherein the restriction member is formed of a ring-shaped member that is disposed, before the airbag inflates, along the front and rear surfaces of the inner bag so as to surround the inner bag, and
wherein a portion of the ring-shaped member disposed along the front surface of the inner bag is joined to the front surface of the outer bag.

6. The airbag device according to claim 1,
wherein the inner bag has a tubular inflation portion projecting outward, and
wherein the tubular inflation portion is pulled by the restriction member and passes through the opening when the opening in the restriction member moves.

7. The airbag device according to claim 6,
wherein an end of the tubular inflation portion is disposed, before the airbag inflates, on the outside of the outer bag through a passing hole provided in the outer bag and is pulled by the restriction member into the outer bag when the opening in the restriction member moves.

8. The airbag device according to claim 7,
wherein the inner bag has a discharge port at the end of the tubular inflation portion, through which the gas inside the inner bag is discharged outside the outer bag.

9. The airbag device according to claim 7,
wherein the outer bag has a vent hole through which the gas inside the outer bag is discharged outside, and
wherein the tubular inflation portion closes the vent hole when the end thereof is disposed outside the outer bag and opens the vent hole when the end thereof is pulled into the outer bag.

10. The airbag device according to claim 9,
wherein the outer bag has a vent hole cover having a through-hole that overlaps the vent hole when the vent hole is opened.

* * * * *